(12) United States Patent
Eriksson et al.

(10) Patent No.: US 10,656,286 B2
(45) Date of Patent: May 19, 2020

(54) V2V CLUSTERING AND MULTI-HOP COMMUNICATION

(71) Applicant: VEONEER US INC., Southfield, MI (US)

(72) Inventors: Olof Eriksson, Älvsjö (SE); Tobias Aderum, Göteborg (SE)

(73) Assignee: VEONEER US INC., Southfield, MI (US)

( * ) Notice: Subject to any disclaimer, the term of this patent is extended or adjusted under 35 U.S.C. 154(b) by 0 days.

(21) Appl. No.: 16/568,609

(22) Filed: Sep. 12, 2019

(65) Prior Publication Data

US 2020/0003861 A1 Jan. 2, 2020

Related U.S. Application Data

(63) Continuation of application No. PCT/US2017/067187, filed on Dec. 19, 2017.

(30) Foreign Application Priority Data

Mar. 17, 2017 (EP) ..................................... 17161659

(51) Int. Cl.
*G01S 19/51* (2010.01)
*G01S 13/87* (2006.01)
(Continued)

(52) U.S. Cl.
CPC .............. *G01S 19/51* (2013.01); *B60R 21/01* (2013.01); *B60R 21/0134* (2013.01);
(Continued)

(58) Field of Classification Search
CPC ...... G01S 19/51; G01S 13/878; G01S 19/396; G01S 5/0289; G01S 5/0072; G01S 19/48;
(Continued)

(56) References Cited

U.S. PATENT DOCUMENTS

| | | | |
|---|---|---|---|
| 6,304,556 B1 * | 10/2001 | Haas | H04L 45/02 |
| | | | 370/238 |
| 2003/0202465 A1 * | 10/2003 | Cain | H04L 45/04 |
| | | | 370/225 |

(Continued)

*Primary Examiner* — Michael Y Mapa
(74) *Attorney, Agent, or Firm* — Christopher P. Maiorana, PC

(57) ABSTRACT

An apparatus comprising a processor and a transceiver. The processor may (i) receive messages from a plurality of vehicles and (ii) determine relative coordinates of the vehicles based on the messages. The transceiver may (i) communicate the messages using a first channel in a first range and (ii) communicate short messages using a second channel in a second range. Communicating using the second channel may consume more power than communicating using the first channel. The messages may be sent from the transceiver to a cluster head within the first range. The short messages may communicate less data than the messages. The short messages may be sent directly to a target vehicle outside of the first range to determine an associated cluster head for the target vehicle. The messages may be sent to the target vehicle from the associated cluster head via the cluster head within the first range.

15 Claims, 11 Drawing Sheets

(51) Int. Cl.
<table>
<tr><td>G08G 1/00</td><td>(2006.01)</td></tr>
<tr><td>G05D 1/02</td><td>(2020.01)</td></tr>
<tr><td>G05D 1/00</td><td>(2006.01)</td></tr>
<tr><td>G08G 1/01</td><td>(2006.01)</td></tr>
<tr><td>G08G 1/16</td><td>(2006.01)</td></tr>
<tr><td>B60R 22/48</td><td>(2006.01)</td></tr>
<tr><td>B60R 21/36</td><td>(2011.01)</td></tr>
<tr><td>B60R 21/231</td><td>(2011.01)</td></tr>
<tr><td>B60R 21/0134</td><td>(2006.01)</td></tr>
<tr><td>B60R 21/01</td><td>(2006.01)</td></tr>
<tr><td>G01S 19/39</td><td>(2010.01)</td></tr>
<tr><td>H04W 56/00</td><td>(2009.01)</td></tr>
<tr><td>H04L 12/26</td><td>(2006.01)</td></tr>
<tr><td>G01S 5/02</td><td>(2010.01)</td></tr>
<tr><td>G01S 5/00</td><td>(2006.01)</td></tr>
<tr><td>G01S 19/48</td><td>(2010.01)</td></tr>
<tr><td>B60W 30/095</td><td>(2012.01)</td></tr>
<tr><td>H04W 4/46</td><td>(2018.01)</td></tr>
</table>

(52) U.S. Cl.
CPC ........ *B60R 21/23138* (2013.01); *B60R 21/36* (2013.01); *B60R 22/48* (2013.01); *B60W 30/0953* (2013.01); *G01S 5/0072* (2013.01); *G01S 5/0289* (2013.01); *G01S 13/878* (2013.01); *G01S 19/396* (2019.08); *G01S 19/48* (2013.01); *G05D 1/0022* (2013.01); *G05D 1/0027* (2013.01); *G05D 1/0214* (2013.01); *G05D 1/0217* (2013.01); *G05D 1/0295* (2013.01); *G08G 1/0112* (2013.01); *G08G 1/0133* (2013.01); *G08G 1/161* (2013.01); *G08G 1/164* (2013.01); *G08G 1/166* (2013.01); *G08G 1/22* (2013.01); *H04L 43/0864* (2013.01); *H04W 4/46* (2018.02); *H04W 56/006* (2013.01); *H04W 56/0065* (2013.01); *B60R 2021/01088* (2013.01); *B60R 2021/01231* (2013.01); *B60R 2021/01272* (2013.01); *B60W 2554/80* (2020.02); *B60W 2556/65* (2020.02); *G01S 2205/002* (2013.01)

(58) Field of Classification Search
CPC .. G01S 2205/002; G08G 1/22; G08G 1/0133; G08G 1/161; G08G 1/0112; G08G 1/166; G08G 1/164; G05D 1/0295; G05D 1/0217; G05D 1/0214; G05D 1/0027; G05D 1/0022; B60R 22/48; B60R 21/36; B60R 21/23138; B60R 21/0134; B60R 21/01; B60R 2021/01272; B60R 2021/01231; B60R 2021/01088; H04W 56/0065; H04W 56/006; H04W 4/46; H04L 43/0864; B60W 30/0953; B60W 2556/65; B60W 2554/80
USPC ............... 455/41.25, 99, 152.1, 297, 345, 455/456.1–457, 466, 569.2, 575.9
See application file for complete search history.

(56) References Cited

U.S. PATENT DOCUMENTS

<table>
<tr><td>2010/0250106 A1</td><td>9/2010</td><td>Bai et al. ................... 701/117</td></tr>
<tr><td>2013/0034016 A1*</td><td>2/2013</td><td>Bai ................... H04W 84/18<br>370/254</td></tr>
<tr><td>2013/0099941 A1*</td><td>4/2013</td><td>Jana ................... H04W 4/023<br>340/905</td></tr>
<tr><td>2013/0279393 A1</td><td>10/2013</td><td>Rubin et al. ................. 370/312</td></tr>
<tr><td>2015/0264627 A1*</td><td>9/2015</td><td>Perdomo ............... H04W 12/08<br>370/329</td></tr>
<tr><td>2016/0073298 A1</td><td>3/2016</td><td>Brahmi et al.</td></tr>
<tr><td>2016/0150451 A1</td><td>5/2016</td><td>Barreto De Miranda Sargento et al.</td></tr>
<tr><td>2016/0212596 A1</td><td>7/2016</td><td>Brahmi et al.</td></tr>
</table>

* cited by examiner

V2V CLUSTERING AND MULTI-HOP COMMUNICATION

This application relates to International Application PCT/US2017/067187, with an International Filing Date of Dec. 19, 2017, which claims the benefit of EP Application No. EP17161659.2, filed Mar. 17, 2017, each of which is incorporated by reference in its entirety.

FIELD OF THE INVENTION

The present invention relates to object positioning generally and, more particularly, to V2V clustering and multi-hop communication.

BACKGROUND OF THE INVENTION

Positioning of objects (i.e., vehicles, buildings, pedestrians, etc.) can be determined using GPS (Global Positioning System) or GNSS (Global Navigation Satellite System). Some applications that use positioning, such as assisted driving, need high precision data to be implemented safely. To calculate high precision data with GPS/GNSS, real-time kinematics (RTK) with base-stations are used, which is currently not viable for commercial use. Host vehicle gyros can also be used to estimate a future expected trajectory of objects, but if the initial GPS/GNSS position is incorrect the problem cannot be solved correctly.

In assisted driving applications, such as active intervention, knowledge of the positions of surrounding vehicles with high accuracy is utilized, which is currently implemented using many different sensors covering 360 degrees around a vehicle. There are many vehicle environment detection systems, such as camera systems, Doppler radar systems and LIDAR systems. Inaccuracies can lead to both false-positives and false-negatives. GPS/GNSS does not provide a sufficient degree of accuracy, especially in urban conditions.

Using periodic broadcasts to perform inter-vehicle range estimation can be used to obtain a high degree of accuracy regarding relative positioning between objects. Determining highly accurate relative positioning between objects introduces additional issues. One such issue is that communication is limited by an amount of transmit power. In clustering, the intended communication recipient vehicles are selected based on current traffic scenarios. In some traffic scenarios, parts of the desired clustering group are outside of the communication range of the host vehicle. Conventional vehicle-to-vehicle (i.e., V2V) communication solutions change the group size and members when entering the communication range. In high traffic scenarios, changing the group size and members limits the usefulness of communications.

It would be desirable to implement V2V clustering and multi-hop communication.

SUMMARY OF THE INVENTION

The present invention concerns an apparatus comprising a processor and a transceiver. The processor may be configured to (i) receive data messages from a plurality of vehicles and (ii) determine relative coordinates of the vehicles based on the data messages. The transceiver may be configured to (i) communicate the data messages using a first channel in a first range and (ii) communicate short messages using a second channel in a second range. Communicating using the second channel may consume more power than communicating using the first channel. The data messages may be sent from the transceiver to a cluster head within the first range. The short messages may communicate less data than the data messages. The short messages may be sent directly to a target vehicle outside of the first range to determine an associated cluster head for the target vehicle. The data messages may be sent to the target vehicle from the associated cluster head via the cluster head within the first range.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing V2V clustering and multi-hop communication that may (i) enable direct communication between vehicles outside of a basic safety message communication range, (ii) communicate using a higher output power, (iii) communicate using a control channel, (iv) communicate information about a cluster head in a short message, (v) reduce a communication time in vehicle-to-vehicle communication, (vi) avoid multi-hopping when establishing data communication, (vii) improve safety in high speed scenarios, (viii) facilitate multi-hop data communication, (ix) reduce a chance of radio congestion and/or (x) be easy to implement.

Grouping and/or clustering may be used in telecommunication. Additionally, grouping and/or clustering may be implemented in the area of cooperative positioning, which is described in, "Improving Cooperative Positioning for Vehicular Networks", IEEE Transactions of Vehicular Technology, Vol 60, no. 6 Jul. 2011, appropriate portions of which are incorporated by reference. In an example, grouping may be performed by approximate position and/or vehicle kinetics. A propagation delay of a wireless signal from a transmitter to a receiver may be used to estimate a distance. In one example, a round-trip time (RTT) (e.g., a round-trip delay time) may be used for estimating a distance accurately by sending a wireless signal between vehicles and/or objects (e.g., one at a time). Using periodic broadcasts is described in the paper "Inter-vehicle range estimation from periodic broadcasts" by Urs Niesen, Venkatesan N. Ekambaram, Jubin Jose, and Xinzhou Wu, appropriate portions of which are incorporated by reference. In order to establish initial positions from the measured ranges, Multi-Dimensional Scaling (MDS) may be used. MDS is described in the paper "Joint relative position and velocity estimation for an anchorless network of mobile nodes" by Raj Thilak Rajan, Geert Leus, and Alle-Jan van der Veen, appropriate portions of which are incorporated by reference.

Figure 1:
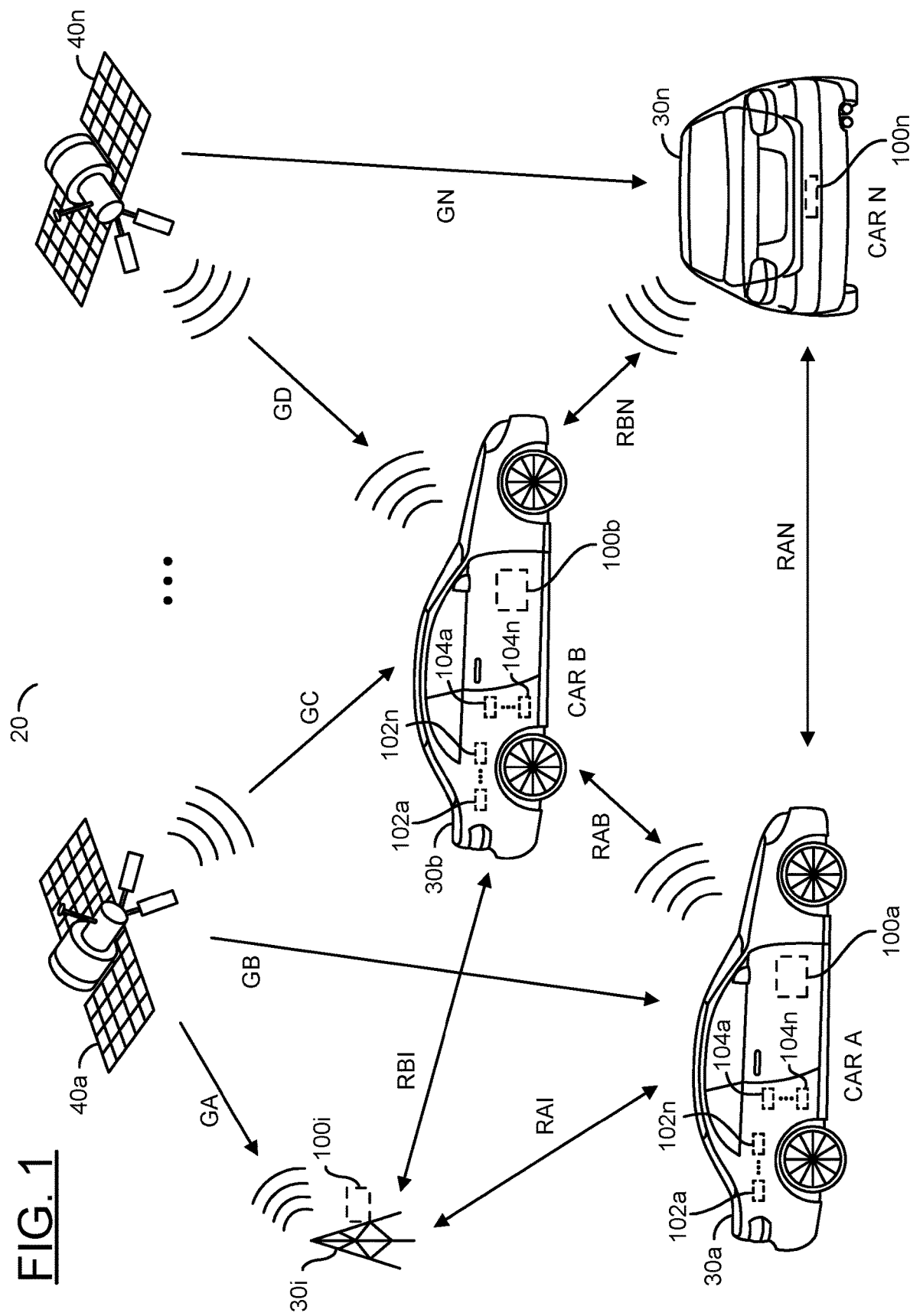
FIG. 1 is a diagram illustrating an embodiment of the present invention.

Referring to FIG. 1, a diagram illustrating an embodiment of the present invention is shown. An example system 20 is shown. The system 20 may comprise a number of objects 30a-30n and/or a number of communication satellites 40a-40n. In the example shown, the objects may comprise a combination of vehicles and/or base stations (e.g., infrastructure). In the example shown, two of the communication satellites 40a-40n are shown as a representation of a Global Positioning System (GPS) and/or Global Navigation Satellite System (GNSS) located around the world. In the example shown, the objects 30a, 30b and/or 30n may be vehicles and the object 30i may be a base station (e.g., a road side unit (RSU)). In some embodiments, each of the objects 30a-30n may be a vehicle (e.g., no base stations). The number of vehicles and/or base stations 30a-30n and/or communication satellites 40a-40n may be varied according to the design criteria of a particular implementation. The system 20 may be configured to adjust and/or self-correct for various numbers of the vehicles and/or base stations 30a-30n and/or communication satellites 40a-40n.

Each of the objects 30a-30n may comprise a respective apparatus (or circuit or module) 100a-100n. The modules 100a-100n may be described in more detail in connection with FIG. 2. The modules 100a-100n may be implemented within and/or attached to the objects 30a-30n. In the example shown, the module 100a is shown within the vehicle 30a and the module 100i is attached to the base station 30i. For example, the modules 100a-100n may be located within a dashboard and/or with other electronics of the vehicles 30a-30n. In some embodiments, the modules 100a-100n may be implemented in a mobile device (e.g., a cell phone, tablet computing device, a computer, a stand-alone GPS device, a fitness monitoring device, a smartwatch, etc.). In an example, the mobile device implementing the modules 100a-100n may be operated within a vehicle that is moving. The location of and/or how the modules 100a-100n are connected to the objects 30a-30n may be varied according to the design criteria of a particular implementation.

In the example shown, the objects 30a-30n and/or the respective modules 100a-100n may be configured to communicate with the communication satellites 40a-40n. Generally, four or more of the communication satellites 40a-40n may be connected (e.g., via wireless communication signals). In another example, the connection to the satellites 40a-40n may be implemented through a GPS-type connection. The satellites 40a-40n may present signals (e.g., GA-GN). An example implementation uses a Global Navigation Satellite System (GNSS) or Global Positioning System (GPS). Location information (e.g., coordinates) may be calculated (e.g., by the modules 100a-100n and/or other components of the objects 30a-30n) from the signals GA-GN received from GNSS or GPS. The positional accuracy of the location information may be determined by the modules 100a-100n.

In some embodiments, the modules 100a-100n may be configured to receive the signals GA-GN sent by the satellites 40a-40n. The modules 100a-100n may be configured to calculate the location information (e.g., position data, coordinates, etc.) of the respective vehicles 30a-30n based on the data in the signals GA-GN. In some embodiments, the objects 30a-30n (e.g., a GPS module) may present the calculated location data to the modules 100a-100n. In some embodiments, (e.g., clear sky conditions with limited and/or no interference and/or multipath errors), the positional accuracy of the location information calculated from the signals GA-GN may be within an acceptable tolerance to provide one independently calculated source of positional data.

Local conditions may be any type of interference and/or multipath factor that may affect a determination of location information (e.g., position coordinates) using the signals GA-GN. For example, the local conditions may be due to ionospheric interference, noise, signal degradation caused by dense urban areas, signal degradation caused by tall buildings, etc. The modules 100a-100n may be configured to supplement and/or enhance the accuracy of the location data of the objects 30a-30n determined from the signals GA-GN by using cooperative positioning. For example, the modules 100a-100n may be configured to provide location data that is more accurate than location data calculated using the signals GA-GN.

In some embodiments, infrastructure (e.g., the base station 30i, in the example shown) may be implemented as a fixed base station, such as a cellular tower, a user installed fixed base station, and/or another type of fixed base station. While only the base station 30i is shown, generally more than one of the base stations 30i may be implemented to provide signals used to calculate the location information. In some embodiments, since the base station 30i may be at a known and fixed location, the base station 30i may be connected to the satellites 40a-40n, calculate location information from the signals GA-GN and provide a verification of the signals GA-GN compared to the known and fixed location of the base station 30i.

In one example, the modules 100a-100n are shown located in the vehicles 30a-30n. The modules 100a-100n may be implemented as a single unit (e.g., an installed device and/or module) and/or a distributed unit. For example, various components of the modules 100a-100n may be implemented at various locations in and/or on the vehicles 30a-30n and connected by an electronic network connecting one or more of the components and enabling a sharing of information in the form of digital signals (e.g., a serial bus, an electronic bus connected by wiring and/or interfaces, a wireless interface, etc.). In some embodiments, the modules 100a-100n may be implemented in an infotainment module of the vehicles 30a-30n.

The vehicles 30a-30n may each comprise a number of blocks (or circuits) 102a-102n and/or blocks (or circuits) 104a-104n. The circuits 102a-102n may be configured to implement sensors. The circuits 104a-104n may be configured to implement actuators. The sensors 102a-102n and/or the actuators 104a-104n may be connected through an electronic bus (to be described in association with FIG. 2) and/or a wireless connection. In some embodiments, the sensors 102a-102n and/or the actuators 104a-104n may be configured to communicate with the modules 100a-100n. The sensors 102a-102n may be configured to capture information from the environment near the vehicles 30a-30n. The actuators 104a-104n may be configured to cause the vehicles 30a-30n and/or components of the vehicles 30a-30n to perform an action. In some embodiments, the sensors 102a-102n and/or the actuators 104a-104n may be configured to read data to detect objects and/or perform actions in response to the detected objects to cause the vehicles 30a-30n to implement functions such as speed control, collision prediction, collision prevention, automatic alignment, online bumper fascia calibration, motion estimation, dead reckoning, Intersection Movement Assist (IMA), Left Turn Assist (LTA), Forward Collision Warning (FCW), Lane Change Warning (LCW) and/or scene understanding.

The modules 100a-100n may be configured to communicate signals (e.g., RAA-RNN). The signals RAA-RNN may be communicated between the modules 100a-100n to determine a relative distance between the objects 30a-30n. Generally, each of the modules 100a-100n may transmit one of the signals RAA-RNN to each of the modules 100a-100n (e.g., within a particular range). In the example shown, the module 100a may transmit the signal RAB to the module 100b, the signal RAI to the module 100i and the signal RAN to the module 100n. Similarly, in the example shown, the module 100b may transmit the signal RAB to the module 100a, the signal RBI to the module 100i and the signal RBN to the module 100n. The number of the signals RAA-RNN may be varied according to the design criteria of a particular implementation.

The signals RAA-RNN may be used by the modules 100a-100n to calculate a value of the range between the objects 30a-30n. In an example, the signals RAA-RNN may be configured similarly to a radar to measure the amount of time a transmitted signals takes to be sent to a destination and/or return from a destination. For example, the module 100a may perform ranging (e.g., determine the absolute distance between the objects 30a and 30b) by transmitting the signal RAB to the module 100b and measuring how long before the signal RAB returns to the module 100a (e.g., a round-trip time). The communication used to transmit the signal RAA-RNN may be implemented through a cellular network connection (e.g., 3G, 4G, 5G LTE, etc.), a Wi-Fi connection, a GPS-type connection, a radio signal, an ultrasonic signal and/or another type of wireless connection. In one example, the signals RAA-RNN may be implemented on a particular wireless frequency spectrum (e.g., 5.9 GHz Dedicated Short Range Communication spectrum). In another example, the signals RAA-RNN may be implemented as and/or alongside a Basic Safety Message (BSM). In yet another example, Wi-Fi may be implementing and the signals RAA-RNN may be part of a lower layer protocol configured to transmit timestamps (e.g., MAC and/or PHY). The signals RAA-RNN may be used to implement vehicle-to-vehicle (e.g., V2V) and/or vehicle-to-infrastructure (e.g., V2I) communication (e.g., V2X communication). The type of wireless connection used to communicate between the modules 100a-100n may be varied according to the design criteria of a particular implementation.

The relative positioning values (e.g., coordinates) calculated by the modules 100a-100n using the signals RAA-RNN may be configured to enable an implementation of cooperative positioning. The cooperative positioning and/or relative coordinates determined by the modules 100a-100n may have a greater accuracy than the location information determined using the signals GA-GN (e.g., using GNSS data). The cooperative positioning information may be fused with data acquired using the sensors 102a-102n and/or data generated using the signals GA-GN. The higher accuracy and/or precision of the relative position between the objects 30a-30n may reduce uncertainty, reduce a number of false positives, reduce erroneous data calculations and/or enable an improved Automotive Safety Integrity Level (ASIL) classification. For example, in urban scenarios with poor GNSS coverage, there may be GPS uncertainty and relying on GPS information may generate a large number of false positives and/or false negatives. The cooperative positioning may be used together with map information to provide improved navigation information.

The modules 100a-100n may be configured to enable sensor and/or data fusion. For example, the modules 100a-100n may be configured to receive data from one or more (e.g., disparate) sources (e.g., the signals GA-GN, the signals RAA-RNN, the sensors 102a-102n, etc.). The modules 100a-100n may combine and/or analyze the data from the different sources to make inferences about the environment surrounding the objects 30a-30n. The inferences made by the module 100a-100n may provide a greater accuracy and/or precision of data (e.g., relative positioning) than using one of the sources of data alone.

Figure 2:
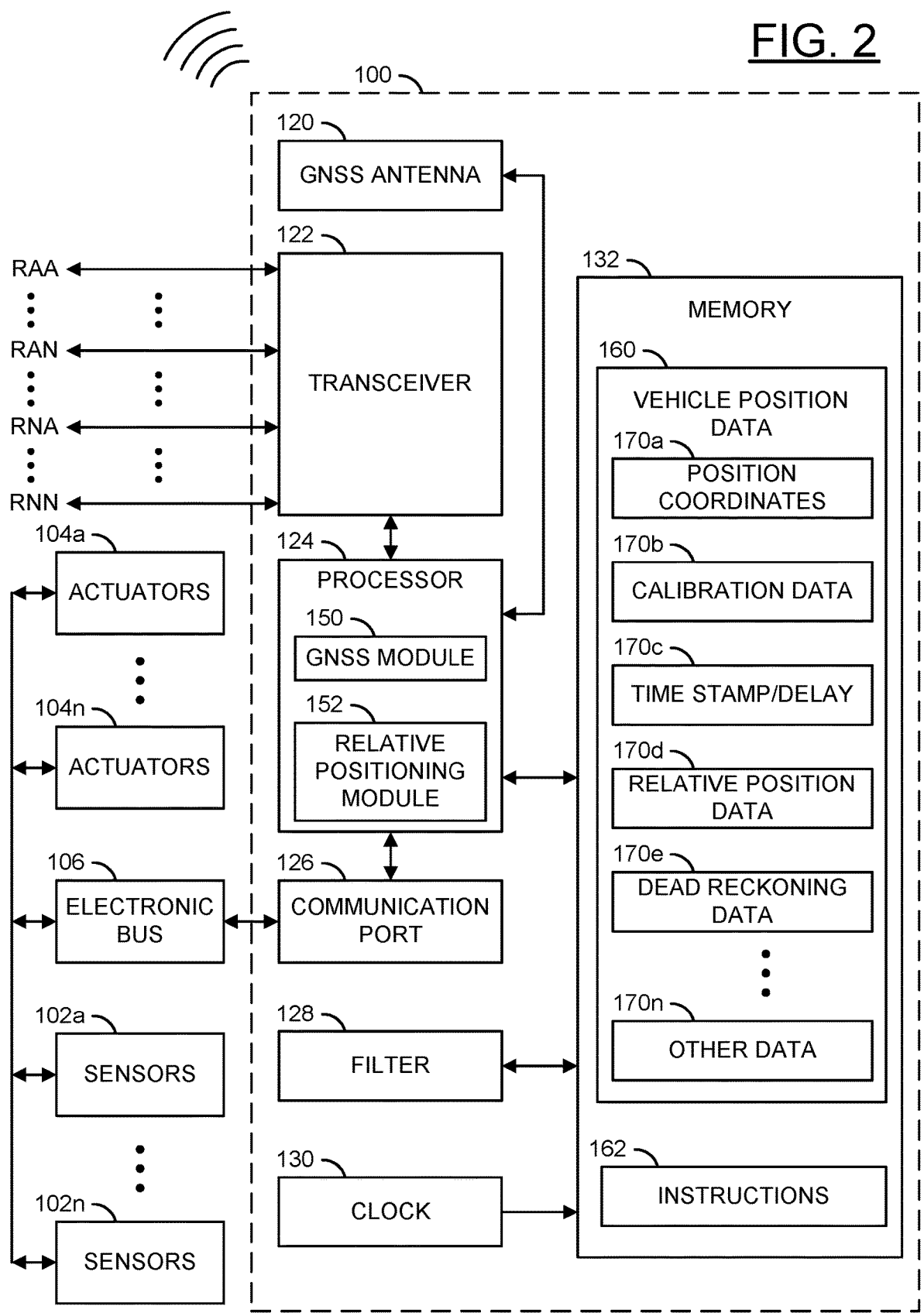
FIG. 2 is a diagram illustrating a module configured to determine high-precision range estimation.

Referring to FIG. 2, a diagram illustrating an example one of the modules 100a-100n configured to determine high-precision range estimation is shown. The module 100 is shown as a representative example of one of the modules 100a-100n. The module 100 may be configured to generate and/or calculate a position relative to other vehicles. The module 100 is shown transmitting/receiving the signals RAA-RNN. The module may send/receive other signals (not shown). For example, the module 100 may receive one or more of the signals GA-GN. The number and/or type of signals sent and/or received by the module 100 may be varied according to the design criteria of a particular implementation.

The module 100 may be connected to a block (or circuit) 106. The circuit 106 may implement an electronic bus. The electronic bus 106 may be configured to transfer data between the module 100 and the sensors 102a-102n and/or the actuators 104a-104n. In some embodiments, the electronic bus 106 may be implemented as a vehicle CAN bus. The electronic bus 106 may be implemented as an electronic wired network and/or a wireless network. Generally, the electronic bus 106 may connect one or more components of the vehicle 30 to enable a sharing of information in the form of digital signals (e.g., a serial bus, an electronic bus connected by wiring and/or interfaces, a wireless interface, etc.).

The module 100 generally comprises a block (or circuit) 120, a block (or circuit) 122, a block (or circuit) 124, a block (or circuit) 126, a block (or circuit) 128, a block (or circuit) 130 and/or a block (or circuit) 132. The circuit 120 may implement a GNSS antenna. The circuit 122 may implement a transceiver. The circuit 124 may implement a processor. The circuit 126 may implement a communication port. The circuit 128 may implement a filter. The circuit 130 may implement a clock. The circuit 132 may implement a memory. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to the base stations 30i) and/or a GNSS network (e.g., the communication satellites 40a-40n). In another example, the antenna 120 may be implemented as two antennas. For example, one antenna may be specifically designed to connect to the base station(s) (e.g., 30i), while another antenna may be implemented to connect to the GNSS network satellites 40a-40n. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 106. The implementation of the antenna 120 may be varied according to the design criteria of a particular implementation.

The transceiver 122 may be configured to communicate (e.g., send and/or receive) data (e.g., radio signals). The transceiver 122 may be configured to generate and/or receive one or more of the signals RAA-RNN. The transceiver 122 may receive data from the processor 124 to communicate with external devices (e.g., other of the modules 100a-100n). The transceiver 122 may receive communications from external devices (e.g., other of the modules 100a-100n) and transmit the communication signals to the processor 124. The transceiver 122 may be configured to communicate a Basic Safety Message (BSM) protocol and/or data outside the BSM protocol. In some embodiments, the transceiver 122 may send and/or receive the signals RAA-RNN through the communication port 126 and/or the sensors 102a-102n. The transceiver 122 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 122 may be varied according to the design criteria of a particular implementation.

The processor 124 may be implemented as a microcontroller. The processor 124 may comprise a block (or circuit) 150 and/or a block (or circuit) 152. The circuit 150 may implement a GNSS module and/or chipset. The circuit 152 may implement a relative positioning module. The processor 124 may comprise other components (not shown). In some embodiments, the processor 124 may be a combined (e.g., integrated) chipset implementing processing functionality, the relative positioning chipset 152 and/or the GNSS chipset 150. In some embodiments, the processor 124 may be comprised of a number of separate circuits (e.g., the microcontroller, the GNSS chipset 150 and/or the relative positioning chipset 152). The GNSS module 150 and/or the relative positioning module 152 may each be an optional component of the processor 124. In an example, an off-board circuit (e.g., a component that is not part of the module 100) may perform the functions of the GNSS chipset 150 and send information to the module 100 (e.g., via the bus 106). In another example, an off-board circuit (e.g., a component that is not part of the module 100 such as a distributed and/or scalable computing service) may perform functions for determining the cooperative positioning data and send information to the module 100 (e.g., via the bus 106). The design of the processor 124 and/or the functionality of various components of the processor 124 may be varied according to the design criteria of a particular implementation. The processor 124 is shown sending data to and/or receiving data from the antenna 120, the transceiver 122, the memory 132 and/or the communication port 126.

The memory 132 may comprise a block (or circuit) 160 and a block (or circuit) 162. The block 160 may store vehicle position data. The block 162 may store computer readable instructions (e.g., instructions readable by the processor 124). The vehicle position data 160 may store various data sets 170a-170n. For example, the data sets 170a-170n may comprise position coordinates 170a, calibration data 170b, a time stamp/delay 170c, relative position data 170d, dead reckoning data 170e and/or other data 170n.

The position coordinates 170a may store location information data calculated and/or received by the module 100 from the signals GA-GN presented by the GNSS satellites 40a-40n. The signals GA-GN may provide data from which a particular resolution of location information positional accuracy may be calculated. In some embodiments, the position coordinates 170a may not provide sufficient positional accuracy for particular applications (e.g., lane detection, autonomous driving, etc.). The relative position data 170d may be used to improve the accuracy of the position coordinates 170a. In some embodiments, the position coordinates 170a may be calculated by the filter 128 and/or a component external to the module 100. In some embodiments, the position coordinates 170a may be calculated by the GNSS module 150.

The calibration data 170b may comprise parameters (e.g., coefficients) used to transform data received from the sensors 102a-102n and/or presented to the actuators 104a-104n. The calibration data 170b may provide many sets of coefficients (e.g., one set of coefficients for each of the sensors 102a-102n and/or the actuators 104a-104n). The calibration data 170b may be updatable. For example, the calibration data 170b may store current values as coefficients for the sensors 102a-102n and/or the actuators 104a-104n and as the data from the sensors 102a-102n and/or the actuators 104a-104n drifts the module 100 may update the calibration data 170b in order to maintain accuracy. The format of the calibration data 170b may vary based on the design criteria of a particular implementation.

The time stamp/delay 170c may be used to determine an age of the vehicle position data 160, the time of flight of the signals RAA-RNN and/or the round-trip time of the signals RAA-RNN. In one example, the time stamp 170c may be used to determine if the vehicle position data 160 should be considered reliable or unreliable (e.g., data older than a pre-determined threshold amount of time may be unreliable). In one example, the time stamp 170c may be appended to the signals RAA-RNN. For example, the time stamp 170c may record a time in Coordinated Universal Time (UTC) and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may comprise ranging data corresponding to the relative position of the vehicle 30 (e.g., the ego vehicle) to other vehicles. The relative position data 170d may represent a cooperative position solution (e.g., CoP). The relative position data 170d may be used to account (e.g., compensate) for the local conditions that may affect an accuracy of the position coordinates 170a. The relative position data 170d may provide higher precision location information than the position coordinates 170a. The relative position data 170d may be calculated by the relative positioning module 152.

The dead reckoning data 170e may be used to store past and/or present information to determine positions traveled by the vehicle 30. For example, the dead reckoning data 170e may store a previously determined position of the vehicle 30 (e.g., estimated speed, estimated time of travel, estimated location, etc.). The previously determined position may be used to help determine a current position of the vehicle 30. In some embodiments, the dead reckoning data 170e may be determined based on data from the sensors 102a-102n of the vehicle 52 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations.

The processor 124 may be configured to execute stored computer readable instructions (e.g., the instructions 162 stored in the memory 132). The processor 124 may perform one or more steps based on the stored instructions 162. In an example, the processor 124 may calculate the location information (e.g., based on the received signals GA-GN). In another example, one of the steps of the instructions 162 may be executed/performed by the processor 124 and may determine the relative position data 170d based on the signals RAA-RNN. The instructions executed and/or the order of the instructions 162 performed by the processor 124 may be varied according to the design criteria of a particular implementation.

The communication port 126 may allow the module 100 to communicate with external devices such as the sensors 102a-102n and/or the actuators 104a-104n. For example, the module 100 is shown connected to the external electronic bus 106. The communication port 126 may allow the module 100 to share the cooperative position data 170d with various infrastructure and/or components of the vehicle 30 (e.g., the sensors 102a-102n and/or the actuators 104a-104n). The communication port 126 may allow the module 100 to receive information from the sensors 102a-102n of the vehicle 30 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 128 may be configured to perform a linear quadratic estimation. For example, the filter 128 may implement a Kalman filter. Generally, the filter 128 may operate recursively on input data to produce a statistically optimal estimate. For example, the filter 128 may be used to calculate the position coordinates 170a and/or estimate the accuracy of the position coordinates 170a. In some embodiments, the filter 128 may be implemented as a separate module. In some embodiments, the filter 128 may be implemented as part of the memory 132 (e.g., the stored instructions 162). The implementation of the filter 128 may be varied according to the design criteria of a particular implementation.

The clock 130 may be configured to determine and/or track a time. The time determined by the clock 130 may be stored as the time stamp data 170c. In some embodiments, the clock 130 may be configured to compare time stamps received in the signals RAA-RNN to determine a delay (e.g., a round-trip time).

The module 100 may be configured to calculate a position and/or broadcast data (e.g., via the transceiver 122 and/or the communication port 126) such as the positional coordinates 170a, an age of the data (e.g., when the data was last updated such as the time stamp 170c), the relative position data 170d and/or other data 170n. A method of communication implemented by the transceiver 122 and/or the communication port 126 and/or the type of data transmitted may be varied according to the design criteria of a particular implementation.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. In some embodiments, the module 100 may transmit received data (e.g., the signals GA-GN and/or the signals RAA-RNN) to other components external to the module 100 to perform calculations (e.g., the relative position data 170d may be sent to another component to determine the cooperative positioning solution). For example, PVT may be considered a bare minimum output for navigation. In some embodiments, the module 100 may comprise the GNSS chipset 150 and calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution determined based on the relative position 170d.

In some embodiments, the module 100 may use an external processor (e.g., an off-board processor) to perform the calculations to determine the relative position data 170d. In one example, the external processor may be implemented as a distributed computing service configured to scale and/or provision resources on demand (e.g., cloud computing). For example, the module 100 may receive the signals RAA-RNN and/or do range measurement, transmit the data to the cloud computing service and one or more processors of the cloud computing service may perform the calculations for generating the relative position data 170d. The module 100 may receive the calculations (e.g., the relative position data 170d) from the cloud computing service and store the data in the memory 132. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data 170d. In some embodiments, the instructions 162 may be executed by the processor 124 to provide responses to requests from other components of the vehicle 30. For example, a brake system of the vehicle 30 (e.g., one of the actuators 104a-104n) may request information from the module 100 before performing a particular response (e.g., to slow down).

The sensors 102a-102n may be configured to capture information from the environment surrounding the vehicle 30. The sensors 102a-102n may be vehicle sensors (e.g., speedometer, fluid sensors, temperature sensors, etc.). In some embodiments, data from the sensors 102a-102n may be used to determine the dead reckoning data 170e. In one example, the sensors 102a-102n may be various types of sensors configured to determine vehicle movement (e.g., magnetometers, accelerometers, wheel click sensors, vehicle speed sensors, gyroscopes, etc.). In another example, data from the sensors 102a-102n may be used to determine distances and/or directions traveled from a reference point. The types of sensors 102a-102n implemented may be varied according to the design criteria of a particular implementation.

The actuators 104a-104n may be components of the vehicle 30 configured to cause an action, move and/or control an aspect of the vehicle 30. For example, the actuators 104a-104n may be one or more of a braking system, a steering system, a lighting system, windshield wipers, a heating/cooling system, etc. In some embodiments, the actuators 104a-104n may be configured to respond to information received from the module 100 and/or the sensors 102a-102n. For example, if one of the actuators 104a-104n is a steering system, the steering system may receive information from the module 100 indicating that a collision with a nearby vehicle is likely and the steering system may respond by causing the vehicle 30 to change direction. The types of actuators 104a-104n implemented may be varied according to the design criteria of a particular implementation.

In some embodiments, the sensors 102a-102n and/or the actuators 104a-104n may be implemented to enable autonomous driving of the vehicle 30. For example, the sensors 102a-102n may receive and/or capture input to provide information about the nearby environment. The information captured by the sensors 102a-102n may be used by components of the vehicle 30 and/or the module 100 to perform calculations and/or make decisions. The calculations and/or decisions may determine what actions the vehicle 30 should take. The actions that the vehicle 30 should take may be converted into signals readable by the actuators 104a-104n. The actuators 104a-104n may cause the vehicle 30 to move and/or respond to the environment. For example, the module 100 may present an output that provides a relative position of the vehicle 30 to other vehicles. In some embodiments, the module 100 may provide the relative position data 170d (e.g., the cooperative positioning solution) to increase an ASIL classification of the vehicle 30. Other components may be configured to use the data provided by the module 100 to make appropriate decisions for autonomous driving.

The modules 100a-100n may be configured to use round-trip time for estimating relative positions. Using round-trip time to estimate relative positions may result in a multitude of solutions (e.g., since there may be more unknowns than the number of equations). The modules 100a-100n may be configured to reliably and/or unambiguously obtain relative distances between objects (e.g., the objects 30a-30n) by means of round-trip time measurements.

The modules 100a-100n may be configured to perform a position estimation. For example, the modules 100a-100n may each comprise the transceiver 122 configured to send and/or receive the radio signals RAA-RNN. The processor 124 of each of the modules 100a-100n may be configured to repeatedly perform a number of steps according to the instructions 162. In one example, the processor 124 may execute one or more of the instructions 162 to calculate a time of flight (TOF) for the signals RAA-RNN. For example, the signals RAA-RNN may be sent pair-wise between two of the transceivers 122 (e.g., a transceiver 122 implemented by the module 100a and a transceiver 122 implemented by the module 100b). In another example, the processor 124 may execute one or more of the instructions 162 to calculate possible positions for the modules 100a-100n, which may result in many possible positions for each of the modules 100a-100n. In yet another example, the processor 124 may execute one or more of the instructions 162 to perform multi-dimensional scaling (MDS) calculations in order to obtain relative positions of the modules 100a-100n in a particular coordinate system. In some embodiments, the processor 124 may be configured to repeatedly perform a procrusting procedure (e.g., after two initial MDS calculations and between every two consecutive MDS calculations). The procrusting procedure may comprise translation, scaling and/or rotation of the particular coordinate system to generate a corrected coordinate system. For example, the procrusting procedure may be configured to determine the corrected present coordinate system such that a smallest change for the relative positions of the modules 100a-100n (e.g., the relative position data 170d) between the consecutive MDS calculations may be obtained.

In some embodiments, for each pair of the modules 100a-100n, the processor 124 may be configured to calculate time of flight as the time for one of the signals RAA-RNN to travel from the transmitting transceiver (e.g., the transceiver 122 of the module 100a) to a receiving transceiver (e.g., the transceiver 122 of the module 100b). In some embodiments, the processor 124 may be configured to calculate time of flight as the time for one of the signals RAA-RNN to travel from a transmitting transceiver to a receiving transceiver and back to the transmitting transceiver (e.g., at least one time, such that round-trip time (RTT) may be determined for each pair of the modules 100a-100n). In some embodiments, the processor 124 may be configured to calculate time of flight either with knowledge of a delay time between each re-transmission and/or by repeated transmissions that comprise time stamps generated by the different modules 100a-100n (e.g., to indicate when the signals RAA-RNN were received by each of the modules 100a-100n). The method of determining the time of flight may be varied according to the design criteria of a particular implementation.

The signals RAA-RNN may be configured to be compatible with a mobile base system protocol. In one example, the protocol implemented by the signals RAA-RNN may be a basic safety message (BSM) plus additional information. Generally, BSM type messages may broadcast similar information. The modules 100a-100n may be configured to send a small message outside of the standard BSM type message protocol. For example, the round-trip time and/or the time stamp 170c may be transmitted as part of the signals RAA-RNN but outside of the BSM message. The signals RAA-RNN may be transmitted at a pre-determined update rate. In one example, the update rate of the signals RAA-RNN may be 10 Hz (e.g., 100 ms). In some embodiments, the signals RAA-RNN may be transmitted as BSM signals via a standard service channel. For example, using the standard service channel, the signals RAA-RNN may be transmitted to a cluster head for the objects 30*a*-30*n*. If a target object is outside a range of the service channel, multi-hopping may be implemented (e.g., transmitting the signals RAA-RNN from a local cluster head to another cluster head and then to the target vehicle). The protocol(s) implemented by the signals RAA-RNN may be varied according to the design criteria of a particular implementation.

Figure 3:
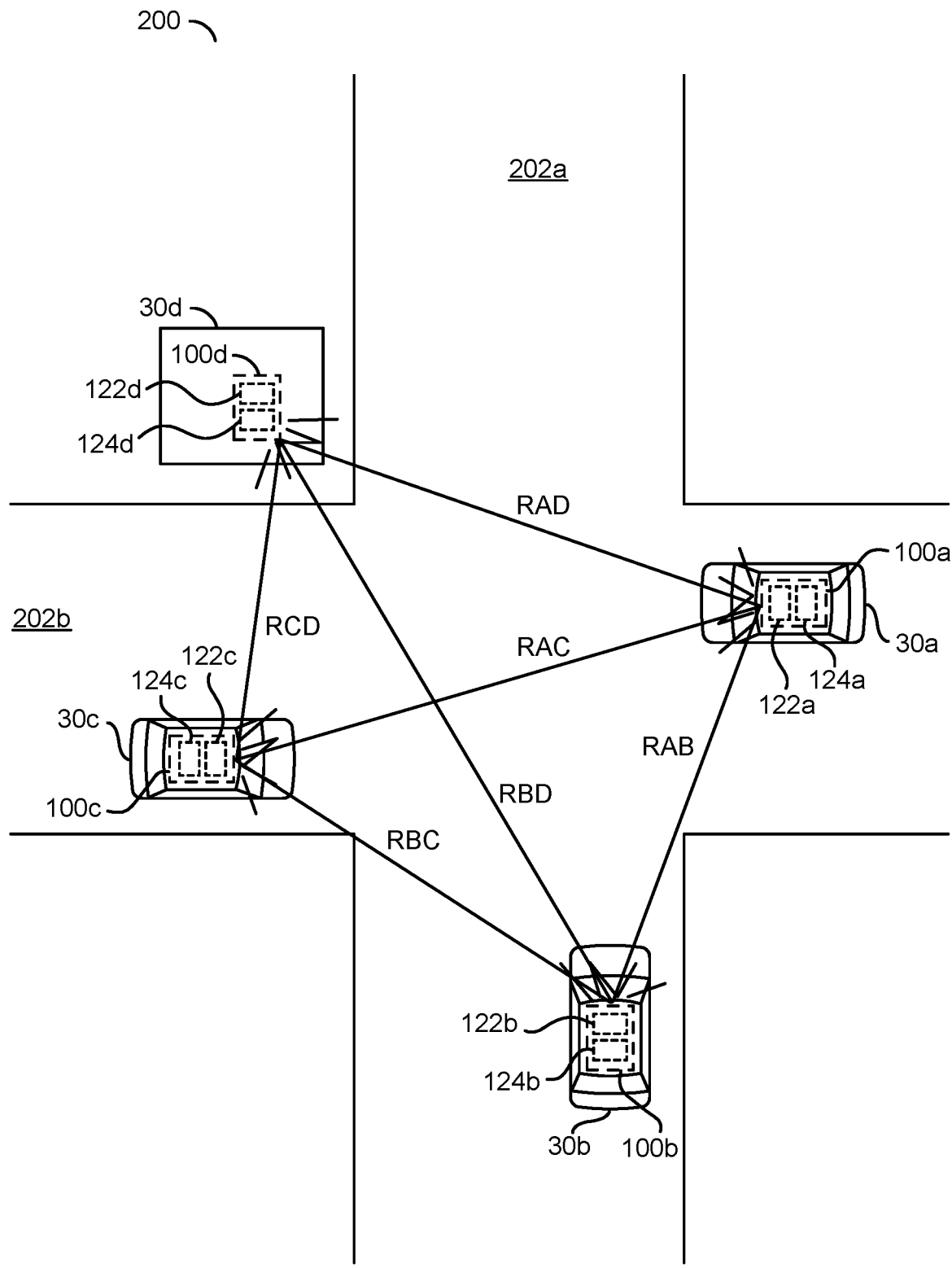
FIG. 3 is a diagram illustrating inter-vehicle range estimation.

Referring to FIG. 3 a diagram illustrating inter-vehicle range estimation is shown. An example system 200 is shown. The example system 200 may be implemented by four objects 30*a*-30*d* at an intersection of a road 202*a* and a road 202*b*. Each of the objects 30*a*-30*d* may comprise a corresponding one of the modules 100*a*-100*d*. In the example system 200, the objects 30*a*-30*c* may be vehicles and the object 30*d* may be infrastructure (e.g., a cell phone tower, a traffic sign, a traffic light, part of a building, etc.). On the vehicle 30*a*, the transceiver 122*a* and the processor 124*a* are shown. Similarly, the objects 30*b*-30*d* may comprise transceivers 122*b*-122*d* and/or processors 124*b*-124*d*. Generally, the example system 200 comprises four of the modules 100*a*-100*n*. However, the number of the modules 100*a*-100*n* may be varied according to the design criteria of a particular implementation.

In the example system 200, the modules 100*a*-100*d* may communicate between at least two other of the modules 100*a*-100*d*. The signal RAB is shown being transmitted between the vehicle 30*a* and the vehicle 30*b*, the signal RAC is shown being transmitted between the vehicle 30*a* and the vehicle 30*c*, the signal RAD is shown being transmitted between the vehicle 30*a* and the object 30*d*, the signal RBC is shown being transmitted between the vehicle 30*b* and the vehicle 30*c*, the signal RBD is shown being transmitted between the vehicle 30*b* and the object 30*d*, and the signal RCD is shown being transmitted between the vehicle 30*c* and the object 30*d*. The signals RAA-RNN may be transmitted simultaneously, in a particular order, in response to one of the signals RAA-RNN and/or periodically. The signals RAA-RNN may be transmitted back and forth between each of the modules 100*a*-100*n*.

In some embodiments, each of the modules 100*a*-100*d* may be configured to calculate the round-trip time for each of the signals RAB-RCD sent between each of the modules 100*a*-100*d*. For example, the module 100*a* may be configured to calculate the round-trip time for each of the signals RAB-RAD sent from the module 100*a* to the other modules 100*b*-100*d*, as well as the round-trip times for the signals RAB, RBC and/or RBD sent by the module 100*b* to the other modules 100*a*, 100*c* and/or 100*d*, the signals RAC, RBC and/or RCD sent by the module 100*c* to the other modules 100*a*, 100*b* and/or 100*d* and/or the signals RAD, RBD and/or RCD sent by the module 100*d* to the other modules 100*a*-100*c*. Using the calculated round-trip times, each of the processing units 124*a*-124*d* may be configured to calculate possible positions for the modules 100*a*-100*d* (and the objects 30*a*-30*d*), which may result in multiple possible positions for each of the modules 100*a*-100*d* (e.g., since there are more unknowns than the number of equations).

In some embodiments, the modules 100*a*-100*d* may be configured to calculate a time of flight (TOF) (e.g., pair-wise) between two of the modules (e.g., 100*a*-100*b*) among the modules 100*a*-100*d*, one or more times. In one example, for each pair of the modules 100*a*-100*d*, the processors 124*a*-124*d* may be configured to determine the time of travel of the signals RAB-RCD from a transmitting one of the modules 100*a*-100*d* to a receiving one of the modules 100*a*-100*d* (e.g., a time of travel of the signal RAB from the transmitting module 100*a* to the receiving module 100*b*). To determine the time of travel (e.g., for time of flight), the modules 100*a*-100*d* may have synchronized clocks (e.g., the clocks 130 may be synchronized). In another example, for each pair of the modules 100*a*-100*d*, the processors 124*a*-124*d* may be configured to determine the round-trip time of travel of the signals RAB-RCD from a transmitting one of the modules 100*a*-100*d* to a receiving one of the modules 100*a*-100*d* and back to the transmitting one of the modules 100*a*-100*d* (e.g., a time of travel of the signal RBC from the transmitting module 100*b* to the receiving module 100*c* and back to the transmitting module 100*b* from the receiving module 100*c*, possibly including a delay time). To determine the time of travel (e.g., for round-trip time), the clocks 130 may not need to be synchronized, but the delay 170*c* may be known. If the delay time 170*c* is not known, repeated transmissions may be implemented (e.g., with 5 time stamps at the different modules 100*a*-100*d*).

Each of the processors 124*a*-124*d* may determine the possible positions for the modules 100*a*-100*d*. The processors 124*a*-124*d* may be configured to perform a multi-dimensional scaling (MDS) operation. The MDS operation may be implemented to calculate relative positions of the modules 100*a*-100*d* in a coordinate system. The processors 124*a*-124*d* may be configured to perform another MDS operation (e.g., at a later time). The MDS operation may be implemented to calculate another set of relative positions of the modules 100*a*-100*d* in another coordinate system. For example, a first MDS operation may determine relative positions in a first coordinate system and a second MDS operation may determine relative positions in a second coordinate system.

Each of the processors 124*a*-124*d* may be configured to perform a procrusting procedure. The procrusting procedure may comprise one or more of translation operations, scaling operations and/or rotation operations of one of the coordinate systems used by the MDS operations. The procrusting procedure may be configured to generate a corrected coordinate system. The corrected coordinate system may be implemented to determine a smallest change for the relative positions of the modules 100*a*-100*d* between the first MDS operation and the second MDS operation. The modules 100*a*-100*d* may be configured to continually perform MDS operations. For each of the following MDS operations, the procrusting procedure may be performed to generate an updated (e.g., current) corrected coordinate system.

The processors 124*a*-124*d* may be configured to continually and/or repeatedly calculate a TOF and/or RTT for the signals RAB-RCD sent between the modules 100*a*-100*d*, calculate possible positions for the modules 100*a*-100*d* (e.g., which may result in numerous possible positions for each of the modules 100*a*-100*d*), and/or perform MDS operations in order to obtain relative positions of the modules 100*a*-100*d* in a coordinate system. After two initial MDS operations, the processors 124*a*-124*d* may be configured to repeatedly perform a procrusting procedure between MDS calculations. In one example, the procrusting procedure may be performed between every two consecutive MDS calculations. The procrusting procedures may generate the corrected coordinate system (e.g., corresponding to the current location of the vehicles 30*a*-30*d*). In one example, the procrusting procedure may be performed using a Maximum Likelihood Estimation (MLE) computation. In another example, the procrusting procedure may be performed using a Least Squares Estimation (LSE) computation. In some embodiments, vehicle dynamics comprising gyro data, acceleration data and/or velocity data (e.g., data from the sensors 102a-102n, the dead reckoning data 170d and/or the position coordinates 170a) may be used by the processors 124a-124d (e.g., to enhance the accuracy of the calculated solution).

The modules 100a-100d may be connected to a warning and/or information device (e.g., a heads up display, an infotainment unit, an audio system, etc.) implemented in a corresponding one of the objects 30a-30d. For example, the warning and/or information device may be configured to send a notification and/or alert to the driver of a vehicle based on the cooperative positioning data calculated by the modules 100a-100d (e.g., a warning if a collision is likely). In some embodiments, the modules 100a-100d may be configured to communicate (e.g., via the electronic bus 106) to other vehicle environment detection devices (e.g., the sensors 102a-102n). For example, the sensors 102a-102n may comprise devices (e.g., radar devices, camera devices, LIDAR devices, etc.) configured to determine a position of one of the objects 30a-30d.

In some embodiments, the objects 30a-30d may not each implement one of the modules 100a-100d. For example, the vehicle 30a may implement the module 100a-100d and the objects 30b-30d may implement the transceivers 122b-122d. Implementing the transceivers 122b-122d without the modules 122b-122d may enable the objects 30b-30d to communicate the signals RAB-RCD but the calculations for the cooperative positioning solution may be performed by the module 100a. For example, the module 100a may determine the cooperative position solution from the signals RAB-RCD and send the data to each of the transceivers 122b-122d to provide the cooperative position solution to the other objects 30b-30d.

In some embodiments, in order to acquire an estimate of the relative position data 170d of the modules 100a-100d within an acceptable tolerance, the processors 124a-124d may be configured to repeatedly perform at least five procrusting procedures with intermediate MDS calculations. In some embodiments, the processors 124a-124d may be configured to calculate time of flight either with knowledge of a delay time between each re-transmission and/or by repeated transmissions with time stamps at the different transceivers.

To determine the relative positions of the modules 100a-100d, the MDS operations may be performed. The output generated in response to the MDS operations may present a true relative position between the objects 30a-30d. The procrusting procedure may be configured to rotate (e.g., rotating an X-Y diagram) the relative positioning (e.g., mirrored and/or translated) to provide additional compensation. The additional compensation performed by the procrusting procedure may provide a correct relative positioning (e.g., the relative position data 170d).

In the example shown, four objects (e.g., 30a-30d) are shown transmitting the signals RAB-RCD. The number of signals and/or objects may be varied according to the design criteria of a particular implementation. Increasing the number of objects (e.g., 30a-30n) may improve an accuracy of the cooperative positioning solution calculated at the cost of computational efficiency. Decreasing the number of objects (e.g., less than four of the objects 30a-30d) may decrease a computational cost but may not provide sufficient accuracy (e.g., the accuracy of the cooperative positioning solution may not be an improvement over a GNSS solution). Generally, determining a cooperative positioning solution using four of the objects 30a-30n may provide a balanced tradeoff between an accuracy of the relative positioning coordinates 170d and the computational processing power of the processor 124. For example, using more than four of the objects 30a-30n may provide diminishing returns on the accuracy of the relative positioning coordinates 170d.

In some embodiments, the modules 100a-100d may be configured to predict a trajectory (e.g., path) of the objects 30a-30d. The modules 100a-100d may calculate and/or receive an associated location and/or velocity (e.g., a low accuracy position, speed and/or heading) for each of the objects 30a-30d. In one example, the predicted trajectory may be calculated using the GPS heading and/or GPS speed information. In another example, the predicted trajectory may be calculated using the time of flight and/or round-trip time information. In yet another example, the predicted trajectory may be calculated based on the shape and/or path of the roads 202a-202b. In still another example, one or more of the objects 30a-30d may not have a predicted trajectory and/or have a null value for the predicted trajectory (e.g., the object 30d may be stationary). The predicted trajectory may be communicated to/from the modules 100a-100d as data messages using the signals RAB-RCD and/or stored in the memory 132.

Figure 4:
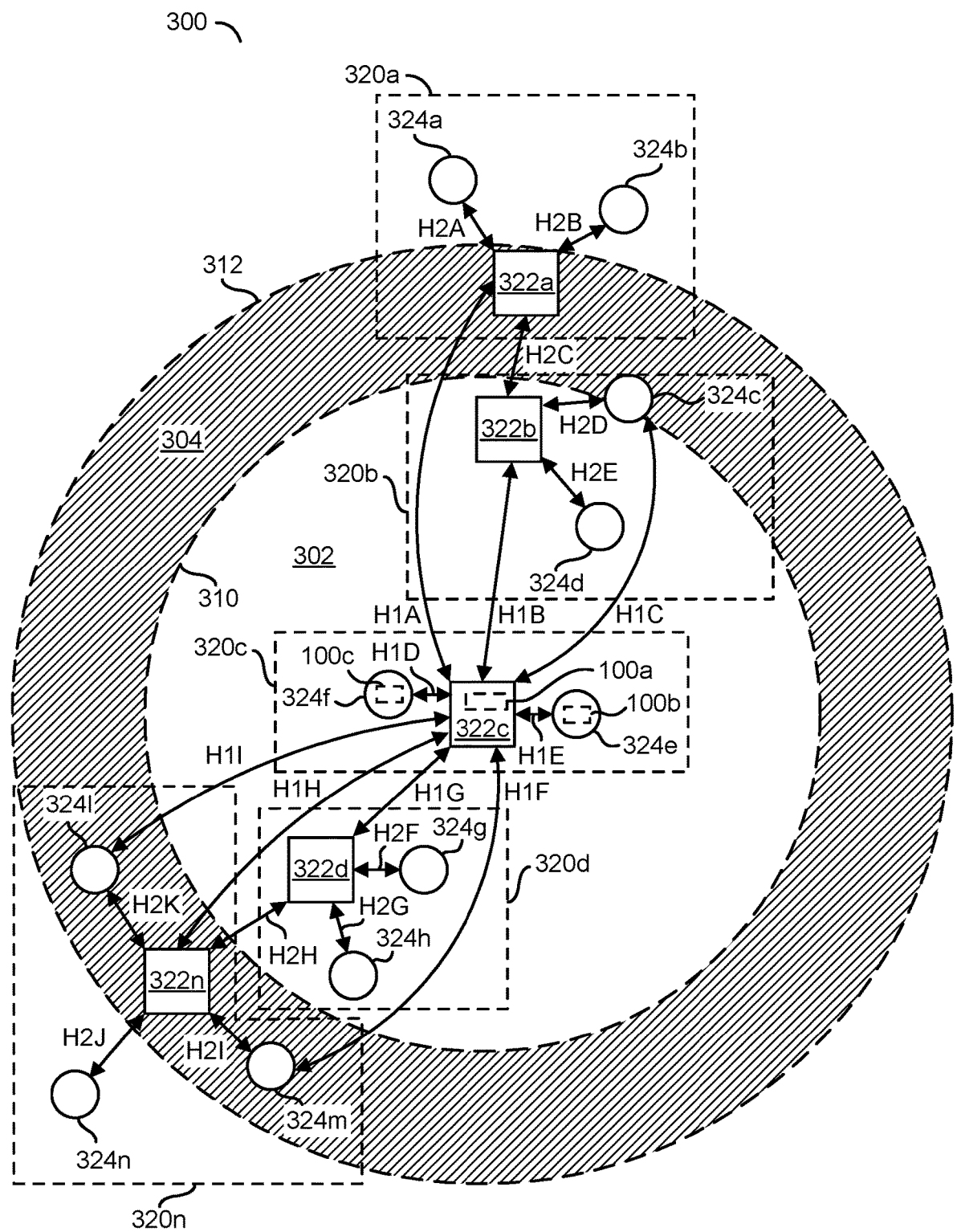
FIG. 4 is a diagram illustrating vehicle clusters in a first and second communication range.

Referring to FIG. 4, a diagram illustrating a multi-hop example 300 comprising vehicle clusters in a first and second communication range is shown. A region 302 and a region 304 are shown. The region 302 may be a data message communication (e.g., service) region. The region 304 may be a control channel communication region. A communication range 310 and a communication range 312 are shown. The communication range 310 may be the maximum range of the data message channel communication. The communication range 312 may be the maximum range of the control channel (e.g., short message) communication.

In the multi-hop example 300, a number of vehicle clusters 320a-320n are shown. Each vehicle cluster may comprise a group of vehicles and/or base stations (e.g., the objects 30a-30n shown in association with FIG. 1). Each of the vehicles within each of the clusters 320a-320n may be within a proximity and/or range of each of the other vehicles in the same cluster. In one example, each of the vehicles in one of the clusters 320a-320n may be within approximately 100 m or each other (e.g., in a non-line of sight scenario, each of the vehicles may need to be in communication range and the maximum range may be approximately 100 m). The amount of distance between the vehicles may be varied according to the design criteria of a particular implementation and/or communication protocols and/or technology implemented. In the multi-hop example 300, five of the clusters 320a-320n are shown. However, the number of clusters 320a-320n may be varied according to the design criteria of a particular implementation.

Cluster heads 322a-322n are shown. A respective one of the cluster heads 322a-322n may be within each of the clusters 320a-320n. One of the vehicles 30a-30n in each of the clusters 320a-320n may be one of the cluster heads 322a-322n. In some embodiments, the cluster heads may be implemented as a base station. In the example shown, the cluster head 322a may be the cluster head for the cluster 320a. Similarly, the cluster head 322b may be cluster head for the cluster 320b. Each of the cluster heads 322a-322n may correspond to one of the clusters 320a-320n.

Cluster nodes 324a-324n are shown. The cluster nodes 324a-324n may be vehicles belonging to one or more of the clusters 320a-320n. Generally, each of the cluster nodes 324a-324n may communicate with the corresponding one of the cluster heads 322a-322n. For example, each of the clusters 320a-320n may comprise a respective one of the cluster heads 322a-322n and/or a number of the cluster nodes 324a-324n. In one example, the cluster 320a may comprise the cluster head 322a, the cluster node 324a and the cluster node 324b. In another example, the cluster 320b may comprise the cluster head 322b, the cluster node 324c and the cluster node 324d. Each of the cluster heads 322a-322n may be one of the cluster nodes 324a-324n (e.g., a cluster head may be a special case of a cluster node). The number of cluster nodes 324a-324n within each of the clusters 320a-320n and/or which of the cluster nodes 324a-324n belong to which of the clusters 320a-320n may be varied according to the design criteria of a particular implementation.

In the multi-hop example 300, the module 100a is shown implemented by the cluster head 322c, the module 100b is shown implemented by the cluster node 324e and the module 100c is shown implemented by the cluster node 324f. In the multi-hop example 300, the cluster head 322c, the cluster node 324e and the cluster node 324f each belong to the cluster 320c. Similarly, each of the cluster heads 322a-322n and/or each of the cluster nodes 324a-324n may implement one of the modules 100a-100n (not shown for simplicity).

In the multi-hop example 300, the data message communication region 302 and/or the control channel communication region 304 may be shown with respect to the module 100a (e.g., the cluster head 322c). In an example, the data message communication range 310 may be the range of the data message communication channel of the module 100a (e.g., a maximum range of approximately 100 m-800 m depending on environmental conditions such as whether there are line-of-sight conditions or non-line-of-sight conditions). In another example, the control channel communication range 312 may be the range of the control channel of the module 100a (e.g., approximately twice the range of the data message communication channel). For example, the module 100a may be capable of transmitting one of the signals RAA-RNN with data comprising the BSM message within the data message communication range 310, but the signals RAA-RNN may communicate different data (e.g., a limited data set) beyond the data message communication range 310.

In the multi-hop example 300, the cluster node 324a, the cluster node 324b and/or the cluster node 324n may each be beyond the communication range (e.g., both the data message communication range 310 and the control channel range 312) of the signals RAA-RNN of the module 100a. In the multi-hop example 300, the cluster head 322a, the cluster head 322n, the cluster node 324c, the cluster node 324l and/or the cluster node 324m may each be beyond the data message communication range 310 but within the control channel communication range 312 (e.g., within the control channel region 304) of the signals RAA-RNN of the module 100a. In the multi-hop example 300, the cluster head 322b, the cluster head 322d, the cluster node 324d, the cluster node 324e, the cluster node 324f, the cluster node 324g and/or the cluster node 324h may be within the data message communication range 310 (e.g., within the data message communication region 302) of the signals RAA-RNN of the module 100a.

Generally, the concept of forming the clusters 320a-320n are known. For example, the clusters 320a-320n may be formed and re-formed based on a current traffic scenario. For example, a group size (e.g., the number of cluster nodes 324a-324n within one of the clusters 320a-320n), the members (e.g., which of the cluster nodes 324a-324n belong to which of the clusters 320a-320n and/or which of the vehicles 30a-30n is one of the cluster heads 322a-322n and/or which of the vehicles 30a-30n are the cluster nodes 324a-324n) may vary based on traffic conditions and/or relative proximity. In one example, the clusters 320a-320n may gain and/or drop the cluster nodes 324a-324n as the vehicles 30a-30n enter the communication range (e.g., the data message communication range 310 and/or the control channel communication range 312). In another example, one of more of the cluster nodes 324a-324n may become one of the cluster heads 322a-322n and/or one of the cluster heads 322a-322n may become one of the cluster nodes 324a-324n as traffic patterns change. However, re-arranging the vehicles 30a-30n within each of the clusters 320a-320n may have limited usefulness in some traffic scenarios (e.g., high speed traffic scenarios).

The modules 100a-100n may be compliant with the Wireless Access for Vehicular Environments (WAVE) standard for V2V and/or V2x communications. The WAVE standard implemented by the modules 100a-100n may limit the amount of information that may be transmitted in the control channel compared to the actual data message channel (e.g., the service channel). For example, short messages using the control channel may be shorter (comprise less information) compared to the data messages. However, the control channel may enable a possibility of using more power to transmit the signals RAA-RNN a greater distance. In one example, one amount of power may be used by the modules 100a-100n to transmit the signals RAA-RNN comprising information for the data message communication (e.g., service) channel to a distance of the data message communication range 310. In another example, a second amount of power may be used by the modules 100a-100n to transmit the signals RAA-RNN comprising information corresponding to the control channel to a distance of the control channel range 312.

Generally, the amount of power used and/or the amount of distance of the transmission by the modules 100a-100n is greater for the control channel communication than for the data message communication channel and the amount of information communicated by the data message communication channel is greater than the amount of information communicated by the control channel. In one example, a control channel transmit power may be 7-10 dB higher than the data message channel transmit power. In some embodiments, a 7-10 dB transmit power may enable the control channel to have a maximum range of approximately two times the maximum range of the data message channel.

The modules 100a-100n may be configured to communicate data (e.g., short messages) using the control channel to reach vehicles outside of the range 310 and/or the range 312. Short messages comprising information sufficient to enable clustering may be transmitted using the control channel to reach vehicles outside of the range 312. The modules 100a-100n may communicate data messages (e.g., the BSM information of the signals RAA-RNN, the position coordinates 170a and/or the relative position data 170d) using multi-hopping to reach vehicles outside of the range 310 and/or the range 312. Generally, the amount of information transmitted by the modules 100a-100n using the control channel (e.g., CCH) may be limited. In one example, the short message information communicated by the modules 100a-100n using the control channel may comprise a number of vehicles in the associated one of the clusters 320a-320n, the average heading and/or speed of the associated one of the clusters 320a-320n and/or the position of the associated one of the cluster heads 322a-322n. Generally, the short message information transmitted in the control channel by the modules 100a-100n may correspond to information and/or values available at the cluster heads 324a-324n (e.g., data that may already be used to form the clusters 320a-320n) and/or multi-hop communication paths.

In the multi-hopping example 300, the module 100a is shown transmitting and/or receiving one or more signals (e.g., H1A-H1I). The signals H1A-H1H may represent data message communications between the cluster head 322c and various other cluster heads and/or cluster nodes using one hop (e.g., a direct communication). The signals H1A-H1H may represent both short messages communication and/or data message communications. In the multi-hopping example 300, a number of signals (e.g., H2A-H2K) are shown. The signals H2A-H2K may represent data message communications using greater than one hop from the module 100a to the various other cluster heads and/or cluster nodes. The signals H2A-H2K may represent data message communications. Generally, the signals H1A-H1H and/or the signals H2A-H2K may represent data communicated using the signals RAA-RNN.

In one example, the module 100a may communicate the signal H1A directly from the cluster head 322c to the cluster head 322a in the control channel region 304 using the control channel. In one example, the module 100a may communicate the signal H1B directly from the cluster head 322c to the cluster head 322b in the data message communication region 304 using the data message communication channel. In one example, the module 100a may communicate the signal H1C directly from the cluster head 322c to the cluster node 324c of the cluster 320b in the control channel region 304 using the control channel. In one example, the module 100a may communicate the signal H1D directly from the cluster head 322c to the cluster node 324f of the cluster 320c in the data message communication region 302 using the data message communication channel. In one example, the module 100a may communicate the signal H1E directly from the cluster head 322c to the cluster node 324e of the cluster 320c in the data message communication region 302 using the data message communication channel. In one example, the module 100a may communicate the signal H1F directly from the cluster head 322c to the cluster node 324m of the cluster 320n in the control channel communication region 304 using the control channel. In one example, the module 100a may communicate the signal H1G directly from the cluster head 322c to the cluster head 322d of the cluster 320d in the data message communication region 302 using the data message communication channel. In one example, the module 100a may communicate the signal H1H directly from the cluster head 322c to the cluster head 322n of the cluster 320n in the control channel region 304 using the control channel. In one example, the module 100a may communicate the signal H1I directly from the cluster head 322c to the cluster node 324l of the cluster 320n in the control channel region 304 using the control channel. The signals H1A-H1H shown in the multi-hop example 300 may be illustrative examples of communication by the module 100a using a single hop (e.g., from the source directly to the destination with no other nodes in between). Similarly, the destinations may each respond to the source using the signals H1A-H1H.

In one example, the cluster head 322a may communicate the signal H2A to the cluster node 324a. In one example, the cluster head 322a may communicate the signal H2B to the cluster node 324b. In one example, the cluster head 322b may communicate the signal H2C to the cluster head 322a. In one example, the cluster head 322b may communicate the signal H2D to the cluster node 324c. In one example, the cluster head 322b may communicate the signal H2E to the cluster node 324d. In one example, the cluster head 322d may communicate the signal H2F to the cluster node 324g. In one example, the cluster head 322d may communicate the signal H2G to the cluster node 324h. In one example, the cluster head 322d may communicate the signal H2H to the cluster node 322n. In one example, the cluster head 322n may communicate the signal H2I to the cluster node 324m. In one example, the cluster head 322n may communicate the signal H2J to the cluster node 324n. In one example, the cluster head 322n may communicate the signal H2K to the cluster node 324l. The signals H2A-H2K shown in the multi-hop example 300 may be illustrative examples of communication by the module 100a using multiple hops (e.g., from the source to at least one intermediate node and then to the destination. Similarly, the destination and/or intermediate node may respond using the signals H2A-H2K.

Each of the respective cluster heads 322a-322n may be responsible for communicating with another of the cluster heads 322a-322n. Communicating between the cluster heads 322a-322n may reduce an amount of communication compared to having all of the cluster nodes 324a-324n communicate with each other. However, using a standard BSM protocol (e.g., limited to the range 310), many of the cluster heads 324a-324n may not be reachable (out of range of the data messages). The modules 100a-100n may implement multi-hopping for data messages to reach cluster heads 324a-324n in the region 304.

The signals RAA-RNN (e.g., represented by the signals H1A-H2I and/or the signals H2A-H2K) may operate at an update rate. The update rate may be a frequency that the information is communicated by the modules 100a-100n. In one example the update rate may be 10 Hz (e.g., information messages are sent every 100 ms). In another example, the update rate may be 5 Hz. Each hop of a multi-hop communication may occur at one update interval. The update rate may enable a periodic broadcast of the signals RAA-RNN. The frequency of the update rate may be varied according to the design criteria of a particular implementation.

In the example shown, a multi-hop communication from the cluster head 322c (e.g., the module 100a) to the cluster head 322a in the control channel region 304 may comprise two hops. The first hop may be the signal H1B from the cluster head 322c (e.g., the source) to the cluster head 322b (e.g., the intermediate node) and a second hop may be the signal H2C from the cluster head 322b to the cluster head 322a (e.g., the destination). The signal H1B may be transmitted at a first update interval and the signal H2C may be transmitted at a second update interval. For example, at a 10 Hz update interval, the signal H1B may be received at a first 100 ms and the signal H2C may be received at a second 100 ms (e.g., 200 ms in total time to transmit the information from the source to the destination).

Similarly, the destination cluster head 322a may respond back to the source cluster head 322c using the intermediate cluster head 322b using the signal H2C and the signal H1B. For example, the response by the destination cluster head 322a may take another 200 ms resulting in a 400 ms round trip time for the communication. Generally, for a 10 Hz update rate, the time to send information to a destination and receive the response back at the source may take approximately 100 ms×2N, where N represents the number of hops in the communication. Since the broadcast of the information is periodic, reducing hops may be a practical way to reduce a total communication time. Reducing an amount of time (e.g., reducing the number of hops) to send information and receive a response may be important in high speed traffic and/or other traffic scenarios.

The modules 100a-100n may be configured to enable communication with the objects 30a-30n that may be out of communication range of the transmission capability of the modules 100a-100n (e.g., too far away for the power of the signals, out of range for the normal BSM protocol, out of range of another type of protocol, etc.). The modules 100a-100n may be configured to communicate to intermediate nodes (e.g., another one of the modules 100a-100n) and the intermediate nodes may re-send the same message until the messages reaches the destination (e.g., another one of the modules 100a-100n) intended by the source module. The modules 100a-100n may be configured to reduce a number of hops to communicate with the objects 30a-30n in the control channel region 304 by using more output power to communicate a short message to the cluster heads 324a-324n.

The modules 100a-100n may be configured to transmit/receive short messages and/or data messages. The data messages may communicate within the data message communication region 302 and use multi-hopping to reach vehicles outside of the range 310 (or receive information from the cluster nodes 324a-324n associated with another of the clusters 320a-320n). The short messages may communicate as far as the control channel range 312 to reach vehicles outside of the range 310. The short messages may be configured to initialize communication between the source (e.g., the cluster head 322c) and a destination (e.g., the cluster head 322a). In an example, the initial setup for the communication may comprise finding where the intended recipient object (e.g., car) is to send the message to and communicating to the associated cluster head. The information used by the modules 100a-100n to determine the relative position data 170d may be sent in the data messages using multi-hop communication (e.g., through the normal service channel for BSM communication).

The short messages may carry less information than the data messages. Transmitting the short messages may consume more power than transmitting the data messages. For example, transmitting power for the short messages may be 7-10 dB higher than the transmit power for the data messages. The amount of power consumed for the data messages and/or the short messages may be varied based on the hardware implementation (e.g., power amplifiers, antenna, etc.). Generally, outputting higher power is costly. The short messages may have a larger range (e.g., the range 312) than the data messages (e.g., the range 310). The short messages may be transmitted using the control channel. The data messages may be transmitted using the data message communication channel (e.g., the service channel).

In one example, the module 100a (e.g., the cluster head 322c) may need information from the cluster node 324f and the update interval may be 10 Hz. The cluster node 324f is within the data message region 302 and in the same cluster 320c as the cluster head 322c. The module 100a may transmit the data messages using the data message communication channel to receive a response from the cluster node 324f. The cluster head 322c may transmit the signal H1D to the cluster node 324f (e.g., 100 ms) and the cluster node 324f may respond to the cluster head 322c using the signal H1D (e.g., another 100 ms). The module 100a may have the information to calculate the relative position data 170d in approximately 200 ms.

In another example, the module 100a (e.g., the cluster head 322c) may need information from the cluster node 324d and the update interval may be 10 Hz. The cluster node 324d is within the data message region 302 but in a different cluster (e.g., 320b) than the cluster 320c of the cluster head 322c (e.g., the cluster head 322c may not communicate directly with the cluster node 324d). The module 100a may implement multi-hop communication. The module 100a may transmit the data messages using the data message communication channel to receive a response from the cluster node 324f via the cluster head 322b as an intermediate node. The cluster head 322c may transmit the signal H1B to the cluster head 322b (e.g., 100 ms) and the cluster head 322b may forward the data message to the destination cluster node 324d using the signal H2E (e.g., another 100 ms). The cluster node 324d may respond to the cluster head 322c via a multi-hop using the cluster head 322n as the intermediate node. The cluster node 324d may transmit the data message response to the cluster head 322b using the signal H2E (e.g., another 100 ms) and the cluster head 322b may forward the data message response to the cluster head 322c (e.g., another 100 ms). The module 100a may have the information to calculate the relative position data 170d in approximately 400 ms.

In yet another example (e.g., a high speed traffic scenario), the module 100a (e.g., the cluster head 322c) may need information from the cluster node 324a and the update interval may be 10 Hz. The cluster node 324a is outside of the communication range of the module 100a (e.g., outside both the range 310 and the range 312). The cluster node 324a may belong to the cluster 320a associated with the cluster head 322a. The cluster head 322a may be within the control channel region 304. The module 100a (e.g., cluster head 322c) may initialize the communication with the cluster head 322a using the short message by using the control channel. The module 100a may transmit the short message H1A to initialize the communication (e.g., 100 ms). The cluster head 322a may send an information request from the cluster head 322c to the cluster node 324a using the signal H2A (e.g., another 100 ms). The cluster node 324a may respond to the request and transmit the response to the cluster head 322c using the cluster head 322a and the cluster head 322b as intermediate nodes. The cluster node 324a may respond by sending the signal H2A to the cluster head 322a (e.g., another 100 ms). The cluster head 322a may forward the response as the signal H2C to the intermediate cluster head 322b (e.g., another 100 ms). The intermediate cluster head 322b may forward the response as the signal H1B to the source cluster head 322a (e.g., another 100 ms). The module 100a may have the information to calculate the relative position data 170d in approximately 500 ms. If the module 100a did not use the control channel and/or short message to initialize the communication the cluster head 322c may not receive the information for approximately 600 ms. The modules 100a-100n may implement a combination of direct communication using the short messages to initialize a communication for the data messages with multi-hopping to send information used by the relative positioning module 152 to calculate the relative position solution.

In some embodiments, the short messages may be communicated to the cluster heads 322a-322n and/or the cluster nodes 324a-324n within the region 304. The short messages may be used to determine which of the cluster heads 322a-322n to communicate with in order to communicate the data messages. The short messages may be implemented by the modules 100a-100n to determine if there are objects outside of the range 310 that many need information. The number and/or type of the cluster heads 322a-322n and/or the cluster nodes 324a-324n that communicate using the short messages may be varied according to the design criteria of a particular implementation.

Figure 5:
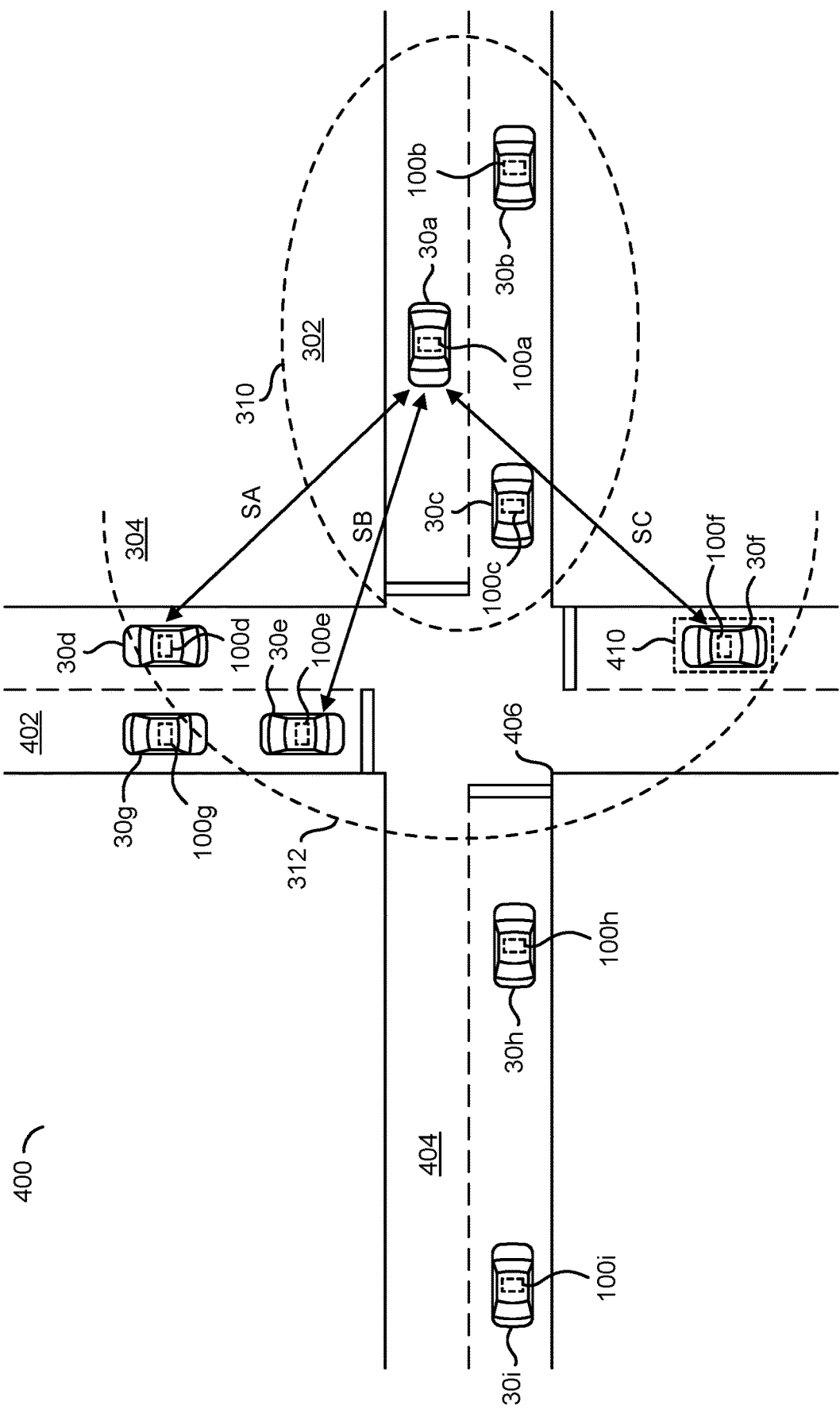
FIG. 5 is a diagram illustrating a host vehicle communicating directly to target vehicles using a control communication channel.

Referring to FIG. 5, a diagram illustrating an example traffic scenario 400 with a host vehicle 30a communicating directly to target vehicles using a control communication channel is shown. A road 402 and a road 404 are shown. The road 402 and the road 402 may meet at an intersection 406. The vehicles 30a-30i are shown in the traffic scenario 400. The vehicle 30d, the vehicle 30e, the vehicle 30f and the vehicle 30g are shown traveling on the road 402. The vehicle 30a, the vehicle 30b, the vehicle 30c, the vehicle 30h and the vehicle 30i are shown traveling on the road 404. Each of the vehicles 30a-30i may comprise a respective one of the modules 100a-100i. The number and/or arrangement of the vehicles 30a-30i and/or the roads 402-404 may be varied according to the design criteria of a particular implementation.

The range 310 and the range 312 are shown. The range 310 and the range 312 may be shown with respect to the module 100a (e.g., the vehicle 30a may be the center point of the range 310 and the range 312). The data message region 302 is shown within the range 310. The vehicle 30a, the vehicle 30b and/or the vehicle 30c may be within the data message region 302. The control channel region 304 is shown within the range 312 and beyond the range 310. The vehicle 30d, the vehicle 30e and/or the vehicle 30f may be within the control channel region 304. The vehicle 30g, the vehicle 30h and/or the vehicle 30i may be outside of the control channel region 304.

To generate the relative position data 170d, the module 100a of the host vehicle 30a may communicate the signals RAA-RNN as data messages to the vehicles 30b and/or the vehicle 30c in the region 302. In some embodiments, to generate the relative position data 170d, the module 100a may use additional information from a vehicle that is far away (e.g., in the control channel region 304). In some embodiments, one or more of the modules (e.g., 100d-100f) in the control channel region may request information from the module 100a.

Signals (e.g., SA-SC) are shown. The signals SA-SC may be transmitted and/or received by the transceiver 122. The signals SA-SC may represent the short messages. The signals SA-SC may use more output power, comprise a limited amount of information and/or be transmitted in the control channel. The short messages SA-SC may be transmitted to each of the modules 100d-100f within the control channel region 304. For example, the signals SA-SC may be transmitted as a beacon broadcasted periodically from the host vehicle 30a. The short messages SA-SC may comprise information about the cluster head associated with the host vehicle 30a. The information received in response to the short messages SA-SC may provide the module 100a with information about which vehicle is the cluster head (e.g., one of the cluster heads 322a-322n described in association with FIG. 4). Receiving the information about which of the cluster heads 322a-322n to communicate with may enable the module 100a to use multi-hopping to communicate the data messages with the vehicles 30d-30e. For example, exchanging the short messages SA-SC may enable the module 100a, the module 100d, the module 100e and/or the module 100f to know which of the modules 100a-100n to send the data messages to.

In some embodiments, the short messages SA-SC may be communicated in response to detected events (e.g., random events). For example, the relative position data 170e may be used to detect a slow moving vehicle, an accident, queues (e.g., a traffic jam). In another example, readings from the sensors 102a-102n may indicate particular road conditions (e.g., the sensors 102a-102n may detect low traction indicating a slippery road). In yet another example, the event may be a pre-determined threshold (e.g., a speed and/or acceleration of the host vehicle 30a). In still another example, a data message from one vehicle may provide a warning about an event that may be forwarded to other vehicles. The host vehicle 30a may initiate multi-hop communication using the short messages SA-SC to warn the other vehicles 30b-30n of the event (e.g., to provide enough reaction time to allow the vehicles 30b-30n to slow down). In one example, the vehicle 30a may detect an accident causing traffic to slow down and/or stop and the short messages SA-SC may be sent to traffic behind the host vehicle 30a to provide information about the accident (e.g., vehicle locations of the damaged vehicles to enable first responders to reach anyone injured, locations where vehicles are backed up because the accident is blocking a path, etc.) to traffic that is approaching the accident.

In some embodiments, the short messages SA-SC may be transmitted in response to communication issues. For example, in a non-line-of-sight scenario, the communication range for the data messages may be limited (e.g., the communication range 310 may be a short range). The modules 100a-100n may be configured to determine the communication ranges 310 and/or 312 and adjust the type of communications (e.g., data message communication and/or short messages to establish multi-hopping communication) based on the size of the ranges 310 and/or 312. For example, if the data message range 310 is short (e.g., the host vehicle 30a is only receiving data messages from vehicles at a short distance), the module 100a may establish multi-hop communication using the short messages SA-SC to enable a longer communication range. Increasing the effective communication range using multi-hopping may enable the modules 100a-100n to receive more data and/or provide more time for the driver and/or autonomous functionality of the vehicles 30a-30n to react.

In some embodiments, the short messages SA-SC may be transmitted at a regular (e.g., fixed) update interval. However, to reduce radio congestion, the short messages SA-SC may not communicate at a fixed update interval (e.g., the short messages SA-SC may be generated in response to detected events). In scenarios where the modules 100a-100n do communicate the short messages SA-SC at a fixed interval (e.g., when the communication range for the data messages is short), then the communication using the short messages SA-SC at a fixed interval may be temporary. For example, the modules 100a-100n may monitor the communication range for the data messages and when the communication range 310 increases, the short messages SA-SC may stop being transmitted at the fixed interval. The times when the short messages SA-SC are transmitted, the events that the short messages SA-SC are transmitted in response to and/or the update interval for communicating the short messages SA-SC may be varied according to the design criteria of a particular implementation.

The information determined by the processor 124 (e.g., the relative positioning module 152) from the short messages SA-SC may enable the processor 124 to configure the transceiver 122 to communicate the data messages with the correct cluster heads 322a-322n. Implementing the short messages SA-SC may enable the processor 124 to avoid a set up communication that multi-hops to all the cluster heads 322a-322n (e.g., extra hops may add additional time to the data message transfer). Since the vehicles 30a-30n assigned to the various clusters 320a-320n may change over time (e.g., the vehicles 30a-30n may be added and removed from the clusters 320a-320n as traffic patterns change), the cluster heads 322a-322n may not always be the important object from which to receive information.

A target vehicle 410 is shown. In the example traffic scenario 400, the target vehicle 410 may correspond to the vehicle 30f. For example, the target vehicle 410 may cross the intersection 406 at approximately the same time as the host vehicle 30a (e.g., a potential collision may occur). However, the target vehicle 410 may be outside of the data message communication range 310 of the host vehicle 30a. Without an indicator to provide knowledge of which of the cluster heads 322a-322n is associated with the target vehicle 410, the module 100a may be unable to configure the transceiver 122 to establish communication with the target vehicle 410.

In some embodiments, the target vehicle 410 may be selected in response to an event. For example, the target vehicle 410 may be one or more vehicles behind the host vehicle 30a to enable the host vehicle 30a to provide a slippery road warning. In some embodiments, the target vehicle 410 may be selected based on cluster position, speed and/or heading. In some embodiments, the target vehicle 410 may be selected in response to information received from the short messages SA-SC. The method of selection of the target vehicle 410 may be varied according to the design criteria of a particular implementation.

In the example traffic scenario 400, the module 100a may transmit the short message SA to the module 100d, the short message SB to the module 100e and/or the short message SC to the module 100f (e.g., each of the vehicles 30d-30f within the control channel region 304). For example, the short messages SA-SC may be broadcast to and received by any vehicle listening within the communication range 312. The short messages SA-SC may query each of the modules 100d-100f to determine which of the vehicles 30d-30f is the cluster head associated with the target vehicle 410. When the module 100a receives the information to determine which of the vehicles 30a-30i is the cluster head associated with the target vehicle 410, the processor 124 may configure the transceiver 122 to establish a multi-hop communication chain to transmit the data messages to the target vehicle 410. For example, in response to the short messages SA-SC, the modules 100d-100f may provide a reply of which of the vehicles 30d-30f are in which of the clusters 320a-320n and/or which of the vehicles 30a-30i is the associated cluster head. The module 100a may receive a replay and initiate a chain of communication between the cluster heads 322a-322n to send the data messages using a multi-hop communication. In some embodiments, the short messages SA-SC may provide initialization information and the target vehicle 410 may send data messages back in response using the multi-hop communication.

Figure 6:
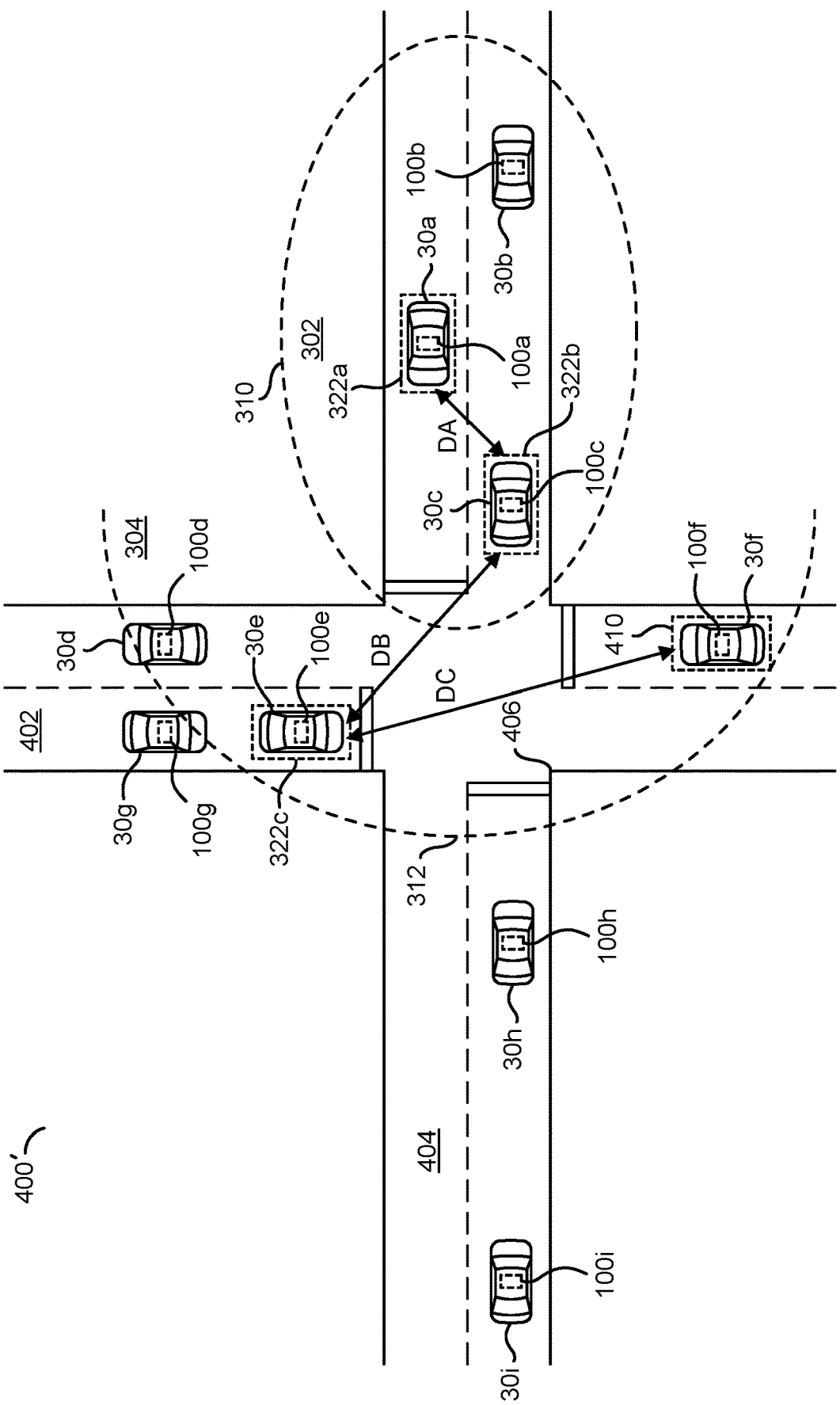
FIG. 6 is a diagram illustrating a host vehicle using multi-hop communication using a data message communication channel.

Referring to FIG. 6, a diagram illustrating the example traffic scenario 400' with the host vehicle 30a using multi-hop communication using a data message communication channel is shown. In the example traffic scenario 400', the host vehicle 30a may have received a reply from the modules 100d-100f located in the control channel region 304 in response to the short messages SA-SC (described in association with FIG. 5). Using the information in the short messages SA-SC, the module 100 of the host vehicle 30a may establish a communication path to/from the target vehicle 410 to send/receive the data messages.

The short messages SA-SC may comprise information readable by the modules 100a-100n to determine which of the cluster heads 322a-322n to communicate with in order to communicate data messages between the host vehicle 30a and the target vehicle 410. In an example, the short messages SA-SC may provide one or more of the cluster heads 322a-322n between the host vehicle 30a and the target vehicle 410. The modules 100a-100n may be configured to decode the information transmitted in the short messages SA-SC, and the processor 124 may configure the transceiver 122 to communicate with the cluster heads 322a-322n indicated by the decoded information.

In the example traffic scenario 400', the host vehicle 30a may establish a multi-hop communication with the target vehicle 410. The module 100a may decode the short messages SA-SC. In the example shown, the information decoded from the short messages SA-SC may indicate that the vehicle 30e is the cluster head (e.g., 322c) associated with the target vehicle 410 (e.g., the vehicle 30f may be one of the cluster nodes 324a-324n associated with the cluster head 322c). Additionally, the information decoded from the short messages SA-SC may indicate that the vehicle 30c may be one of the cluster heads (e.g., 322b) within range of the host vehicle 30a that may be capable of forming an intermediate node to the cluster head 322c. In some traffic scenarios, more than one of the cluster heads 322a-322n may be used as intermediate nodes to reach the cluster head 322c.

Signals (e.g., DA-DC) are shown. The signals DA-DC may represent the data messages. In an example, the data messages DA-DC may comprise the data communicated using the signals RAA-RNN. The data messages DA-DC may each be transmitted up to a distance of the range 310. The data messages DA-DC may be communicated using the data message communication channel. The data messages DA-DC may be implemented as part of a periodic broadcast. The data messages DA-DC may each be transmitted subsequently from vehicle to vehicle at each update interval to form a chain of communication. The chain of communication may be initialized in response to the information provided by the short messages SA-SC. In one example, the data messages DA-DC may comprise a Basic Safety Message appended with time-of-flight information and/or round-trip time information.

In the example traffic scenario 400', the data messages DA-DC may form a chain of communication that establishes a data path from the host vehicle 30a to the target vehicle 410. The data messages DA-DC may be communicated using multi-hopping via the cluster heads. In the example shown, the data path may be from the host vehicle 30a, to the intermediate node cluster head 322b within the range 310 (e.g., the vehicle 30c), then to the cluster head 322c associated with the target vehicle 410 outside of the range 310 (e.g., the vehicle 30e) and then to the destination target vehicle 410 (e.g., the vehicle 30f).

The data message DA may be communicated from the module 100a of the host vehicle 30a to the module 100c of the intermediate node cluster head 322b within a first update interval. After receiving the data message DA, the module 100c of the intermediate node cluster head 322b may forward the data message as the signal DB to module 100e of the cluster head 322c within a second update interval. After receiving the data message DB, the module 100e may forward the message to the module 100f of the target vehicle 410 as the signal DC, within a third update interval. If the arrangement of the clusters 320a-320n has not changed, the target vehicle 410 may transmit a reply to the host vehicle 30a using the same data path. If the arrangement of the clusters 320a-320n has changed, the target vehicle 410 may communicate the short messages (e.g., SA-SN) to determine and/or establish a data path to the host vehicle 30a. To reply to the host vehicle 30a using the same data path, the module 100f of the target vehicle 410 may transmit the data message DC to the module 100e of the associated cluster head 322c, within a fourth update interval. The associated cluster head 322c may forward the reply as the signal DB to the module 100c of the intermediate cluster head 322b within a fifth update interval. The intermediate cluster head 322b may forward the reply as the signal DA to the module 100a of the host vehicle 30a within a sixth update interval. In an example, with an update interval operating at 10 Hz, the communication from the host vehicle 30a and the target vehicle 410 and back may be approximately 600 ms. When the module 100a of the host vehicle 30a receives the response from the target vehicle 410, the relative position solution may be calculated by the relative positioning module 152.

Figure 7:
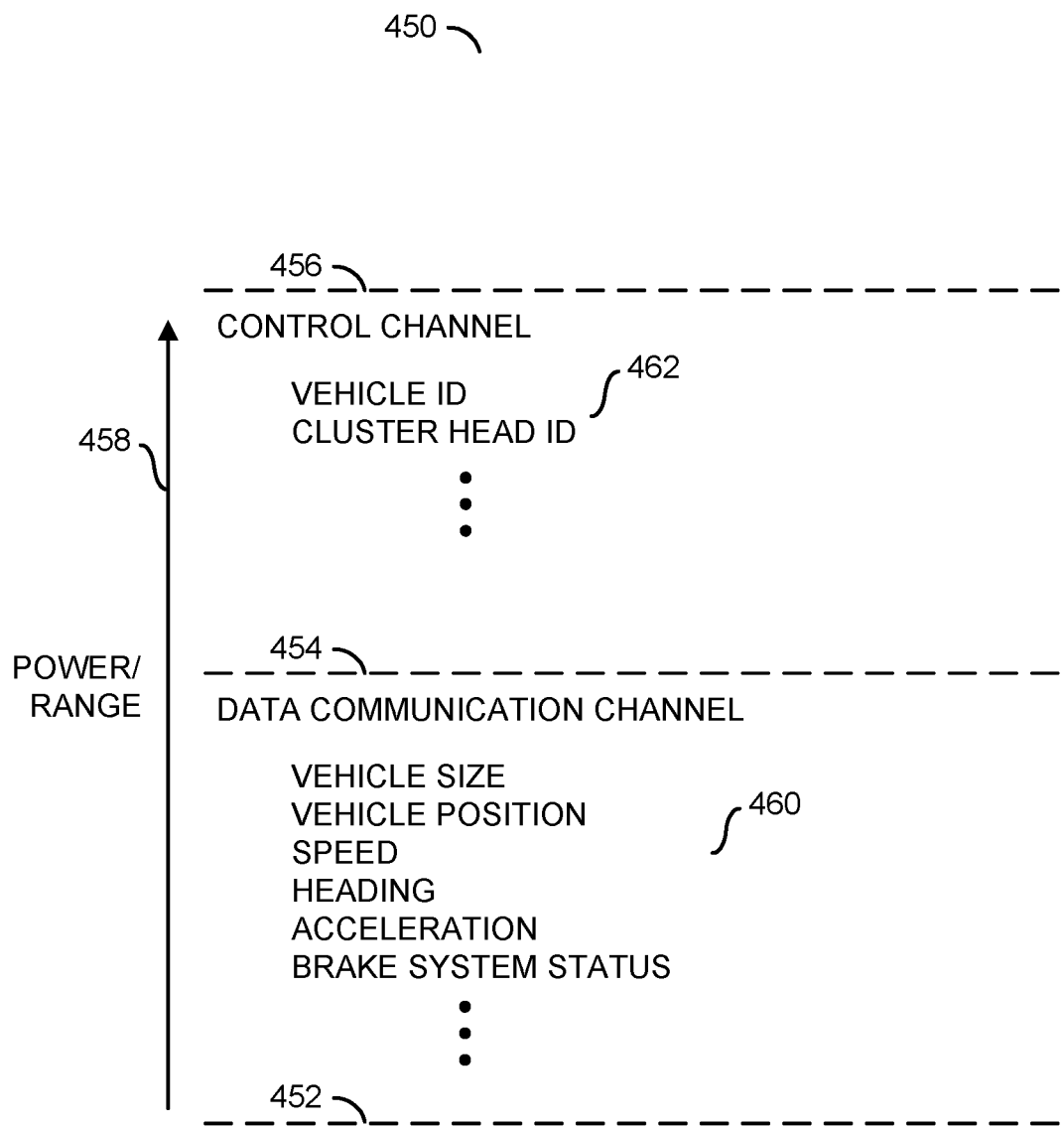
FIG. 7 is a diagram illustrating example information communicated in a control channel and a data message communication channel.

Referring to FIG. 7, a diagram illustrating example information 450 communicated in a control channel and a data message communication channel is shown. A line 452, a line 454, a line 456 and a line 458 are shown. The line 452 may represent a minimum (or zero) range and/or power. For example, the line 452 may correspond to the location of the host vehicle 30a. The line 454 may represent an amount of range and/or power for the data message communication channel. For example, the line 454 may correspond to the range 310. The line 456 may represent an amount of range and/or power for the control channel. For example, the range 456 may correspond to the range 312. The line 458 may represent an increasing amount of power and/or distance from the line 452 to the line 456.

Information 460 is shown in the data message communication channel (e.g., below the line 454). The information 460 may be the information communicated by the data messages DA-DC. Examples of the data message information 460 are shown. For example, the data message information 460 may comprise information corresponding to a size of a vehicle, a position of a vehicle, a speed of a vehicle, a heading of a vehicle, an acceleration of a vehicle, a brake system status of a vehicle, etc. Other information may be communicated in the data message information 460. For example, time of flight information and/or round-trip time information may be included in the data message information 460. The type of information included in the data message information 460 may be varied according to the design criteria of a particular implementation.

Information 462 is shown in the control channel (e.g., below the line 456 and above the line 454). The information 462 may be the information communicated by the short messages SA-SC. Examples of the short message information 462 are shown. For example, the short message information 462 may comprise information corresponding to a vehicle identification and/or a vehicle identification for the associated cluster head. Other information may be communicated in the short message information 462. For example, the short message information 462 may comprise information to identify other cluster heads within range of the vehicle (e.g., to help establish a data path between two communicating vehicles). In another example, the short message information 462 may comprise cluster position, speed and/or heading (e.g., average and/or worst case values). Generally, the amount of data in the short message information 462 is less than the amount of data in the data message information 460.

In some embodiments, the data message information 460 may comprise the same information as the short message information 462 (e.g., the vehicle ID and identification information about available cluster heads). In some embodiments, the data message information 460 may implement a BSM format. For example, the data message information 460 may comprise a BSM format blob. The BSM blob may provide a group of information comprising a message count, a temporary ID, a time (based on the GNSS module 150), a position (e.g., the position coordinates 170a including a longitude, a latitude, an elevation and an accuracy), a vehicle speed, a transmission state, a heading, a steering wheel angle, a vehicle acceleration, a yaw rate, a brake system status, a vehicle length and/or a vehicle length. In another example, the data message information 460 may comprise a vehicle safety extension portion of a BSM format comprising event flags, a path history, a path prediction and/or a package in a Radio Technical Commission For Maritime Services (RTCM) format. In yet another example, the data message information 460 may comprise optional elements such as a vehicle status. In still another example, the data message information 460 may comprise the relative position data 170d and/or the dead reckoning data 170e. Generally, the data message information 460 may comprise BSM data and/or data used to calculate the relative position data 170d (e.g., time of flight information and/or round-trip time information).

The modules 100a-100n may implement the short messages SA-SC and/or the data messages DA-DC with multi-hopping to reduce an amount of radio communication. Reducing the amount of radio communication may prevent radio congestion. For example, if multi-hopping is used for all communications, every one of the vehicles 30a-30n would repeat messages and the communication medium (e.g., the air) could become congested. By implementing clustering and/or the short messages SA-SC to establish efficient communication, the risk of congestion may be reduced.

Figure 8:
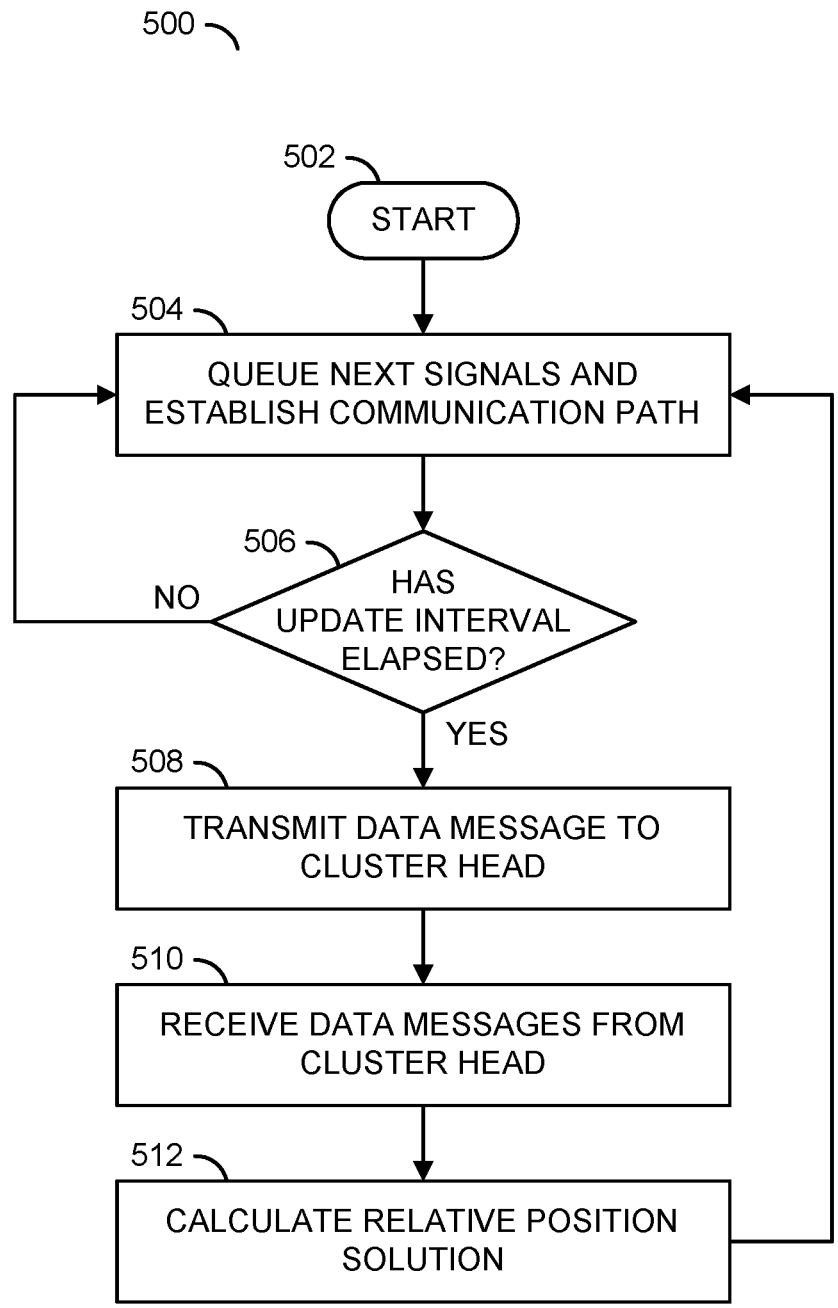
FIG. 8 is a flow diagram illustrating a method for transmitting and/or receiving data messages for calculating a relative position solution.

Referring to FIG. 8, a method (or process) 500 is shown. The method 500 may transmit and/or receive data messages for calculating a relative position solution. The method 500 generally comprises a step (or state) 502, a step (or state) 504, a decision step (or state) 506, a step (or state) 508, a step (or state) 510, and a step (or state) 512.

The state 502 may start the method 500. In the state 504, the processor 124 may queue the next signals to be transmitted using the transceiver 122 and/or establish a communication path (e.g., which of the cluster heads 322a-322n to communicate with to create the chain of communication). For example, a header of the data messages DA-DC and/or the short messages SA-SC may indicate a sequence of the cluster heads 322a-322n to communicate with. Next, the method 500 may move to the decision state 506.

In the decision state 506, the transceiver 122 may determine whether the update interval has elapsed (e.g., 100 ms at an update frequency of 10 Hz). If the update interval has not elapsed, the method 500 may return to the state 504. If the update interval has elapsed, the method 500 may move to the state 508. The update interval may be implemented to ensure proper timing for sending data, receiving data and/or settling signals to ensure the proper (e.g., intended) information is being sent/received. The periodic broadcast may enable each of the modules 100a-100n to receive up-to-date information for calculating the relative position solution.

In the state 508, the transceiver 122 may transmit the data messages DA-DC to one or more of the cluster heads 322a-322n. In one example, the data messages DA-DC may be transmitted as one or more of the signals RAA-RNN. Next, in the state 510, the transceiver 122 may receive one or more of the data messages DA-DC from one or more of the cluster heads 322a-322n. For example, during each update interval, the transceiver 122 may send data messages and/or receive incoming data messages. Next, in the state 512, the processor 124 (e.g., the relative positioning module 152) may calculate the relative position solution. For example, the data messages DA-DC may comprise time of flight information and/or round-trip time information usable to calculate the relative position data 170d. Next, the method 500 may return to the state 502.

Figure 9:
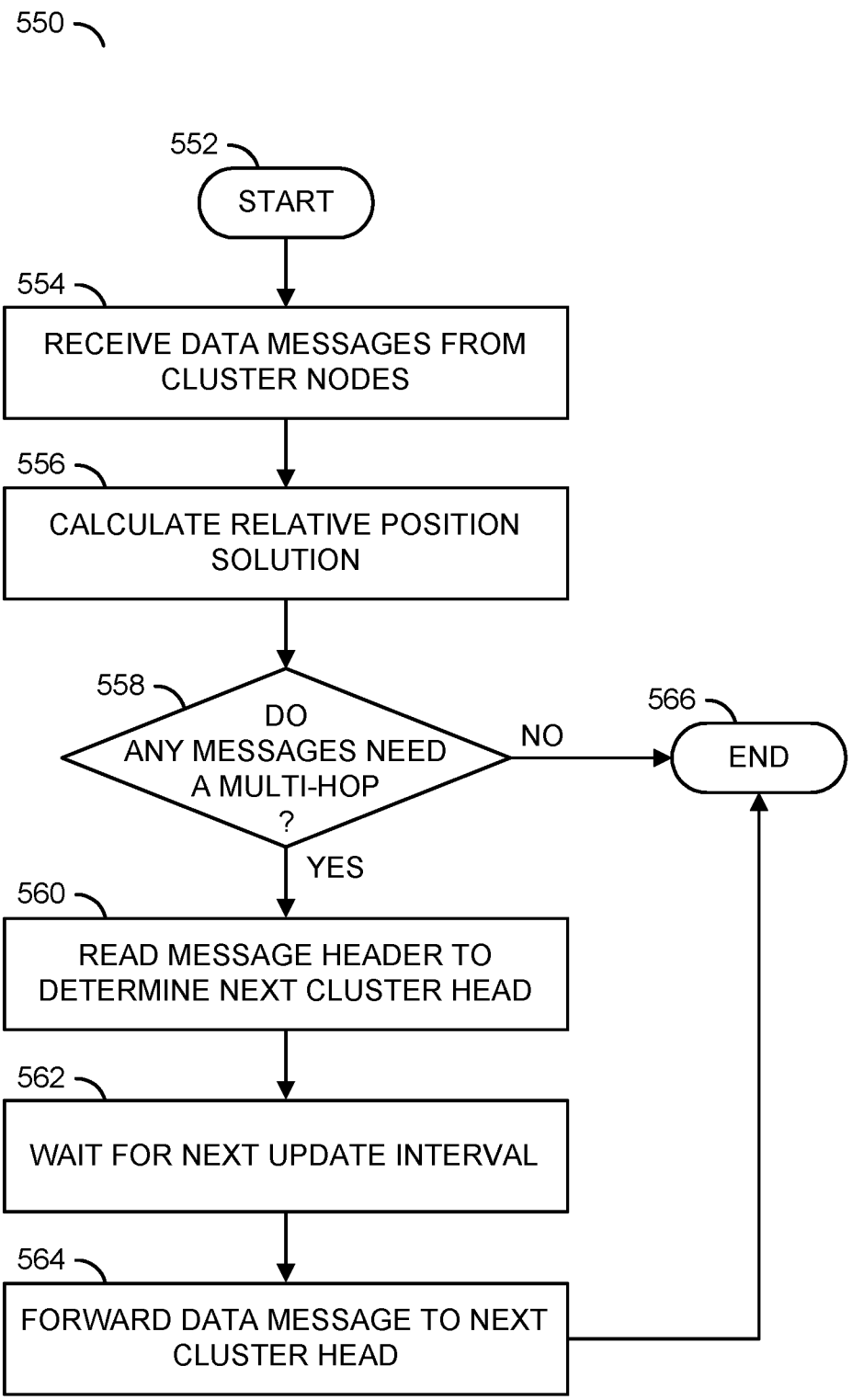
FIG. 9 is a flow diagram illustrating a method for transmitting messages using multi-hop communication.

Referring to FIG. 9, a method (or process) 550 is shown. The method 550 may transmit messages using multi-hop communication. The method 550 generally comprises a step (or state) 552, a step (or state) 554, a step (or state) 556, a decision step (or state) 558, a step (or state) 560, a step (or state) 562, a step (or state) 564, and a step (or state) 566.

The state 552 may start the method 550. Next, in the state 554, the transceiver 122 may receive the data messages DA-DC from each of the cluster nodes 324a-324n. For example, the transceiver 122 receiving the data messages DA-DC may be implemented by one of the cluster heads 322a-322n. In the state 556, the relative positioning module 152 may calculate the relative position solution using the information in the data messages DA-DC. For example, the cluster heads 322a-322n may utilize the information in the data messages DA-DC to calculate the relative position data 170d even if the cluster head is acting as an intermediate node (e.g., is not the final destination). Next, the method 550 may move to the decision state 558.

In the decision state 558, the processor 124 and/or the transceiver 122 may determine whether the data messages DA-DC are being sent on a multi-hop data communication path. For example, the processor 124 and/or the transceiver 122 may read a header of the data messages DA-DC to determine if the data messages DA-DC are to be forwarded to another one of the vehicles 30a-30n. If one or more of the data messages DA-DC are not part of a multi-hop communication, the method 550 may move to the state 566. If one or more of the data messages DA-DC are part of a multi-hop communication, the method 550 may move to the state 560.

In the state 560, the processor 124 and/or the transceiver 122 may read which is the next cluster head in the chain of communication from the header of the data messages DA-DC. Next, in the state 562, the transceiver 122 may wait for the next update interval (e.g., the next periodic broadcast). In the state 564, the transceiver 122 may forward the data messages DA-DC to the next of the cluster heads 322a-322n in the chain of communication. Next, the method 550 may move to the state 566. The state 566 may end the method 550.

Figure 10:
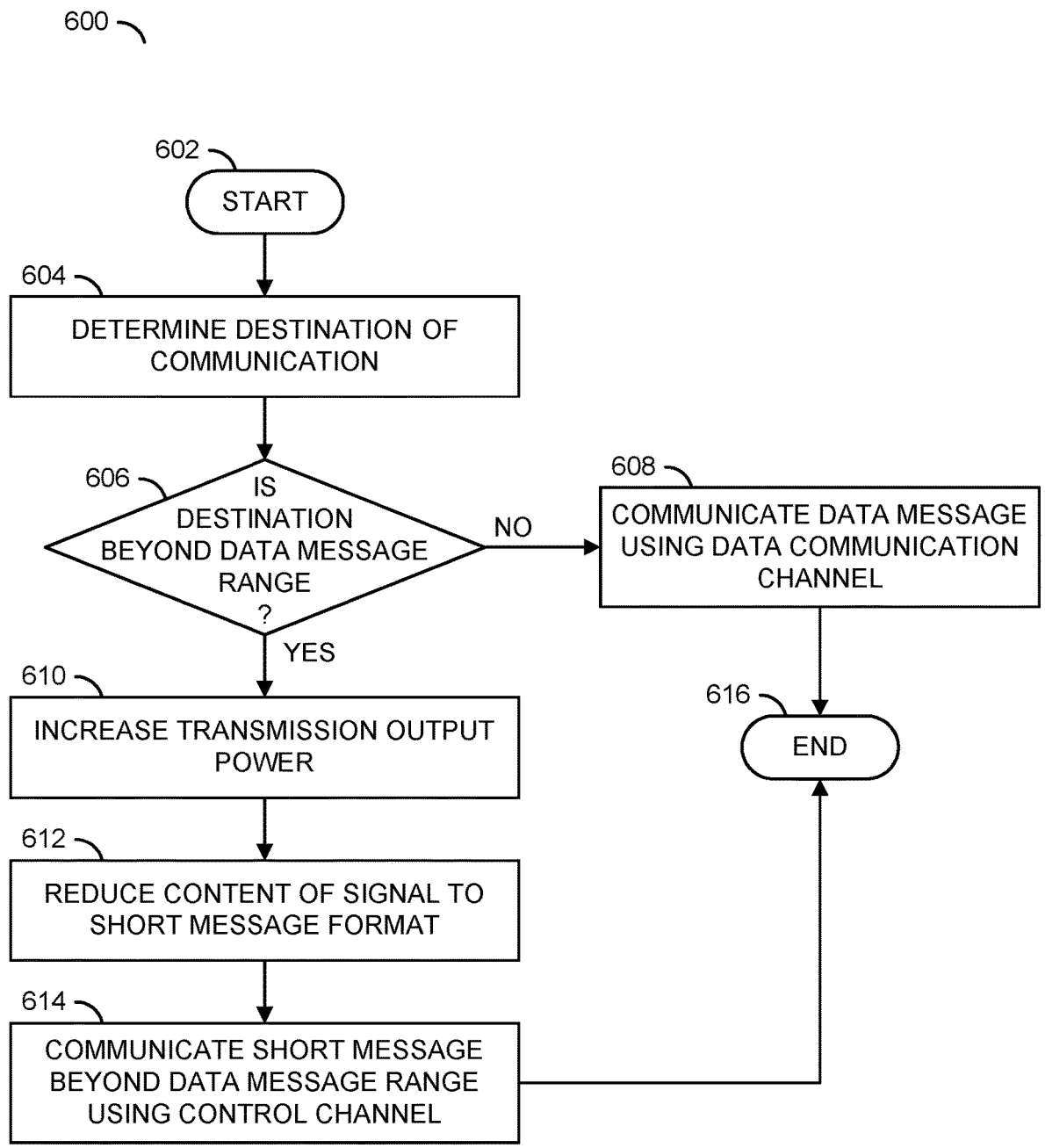
FIG. 10 is a flow diagram illustrating a method for generating a short message using a control channel.

Referring to FIG. 10, a method (or process) 600 is shown. The method 600 may generate a short message using a control channel. The method 600 generally comprises a step (or state) 602, a step (or state) 604, a decision step (or state) 606, a step (or state) 608, a step (or state) 610, a step (or state) 612, a step (or state) 614, and a step (or state) 616.

The state 602 may start the method 600. In the state 604, the processor 124 and/or the transceiver 122 may determine the destination of the communication (e.g., the target vehicle 410). For example, the destination may include how far away the target vehicle 410 is located. Next, the method 600 may move to the decision state 606.

In the decision state 606, the processor 124 may determine whether the destination is beyond the data message range 310. For example, the processor 124 may use information from the position coordinates 170a, the relative position data 170d, data from the sensors 102a-102n and/or data from previous communications with the vehicles 30a-30n to determine how far away the target vehicle 410 is located. If destination is not beyond the range of the data messages 310, the method 600 may move to the state 608. In the state 608, the transceiver 122 may communicate the data messages DA-DC using the communication channel 454 (e.g., directly to the destination and/or using a multi-hop communication with the cluster heads 322a-322n). In some embodiments, the destination may comprise a first intermediate node cluster head for a multi-hop communication. Next, the method 600 may move to the state 616. In the decision state 606, if the destination is beyond the data message range 310 (e.g., in the control channel region 304), the method 60 may move to the state 610.

In the state 610, the processor 124 may increase the output power to the transceiver 122 (e.g., to increase the output range of the communication). Next, in the state 612, the processor 124 may reduce the content of the signal (e.g., one or more of the signals RAA-RNN) to the format of the short messages SA-SC. For example, the format of the short messages SA-SC may be reduced to the content of the short message information 462. In the state 614, the transceiver 122 may communicate the short messages SA-SC beyond the data message range 310 using the control channel 456. For example, the short messages SA-SC may use the increased power to communicate to the control channel range 312. Next, the method 600 may move to the state 616. The state 616 may end the method 600.

Figure 11:
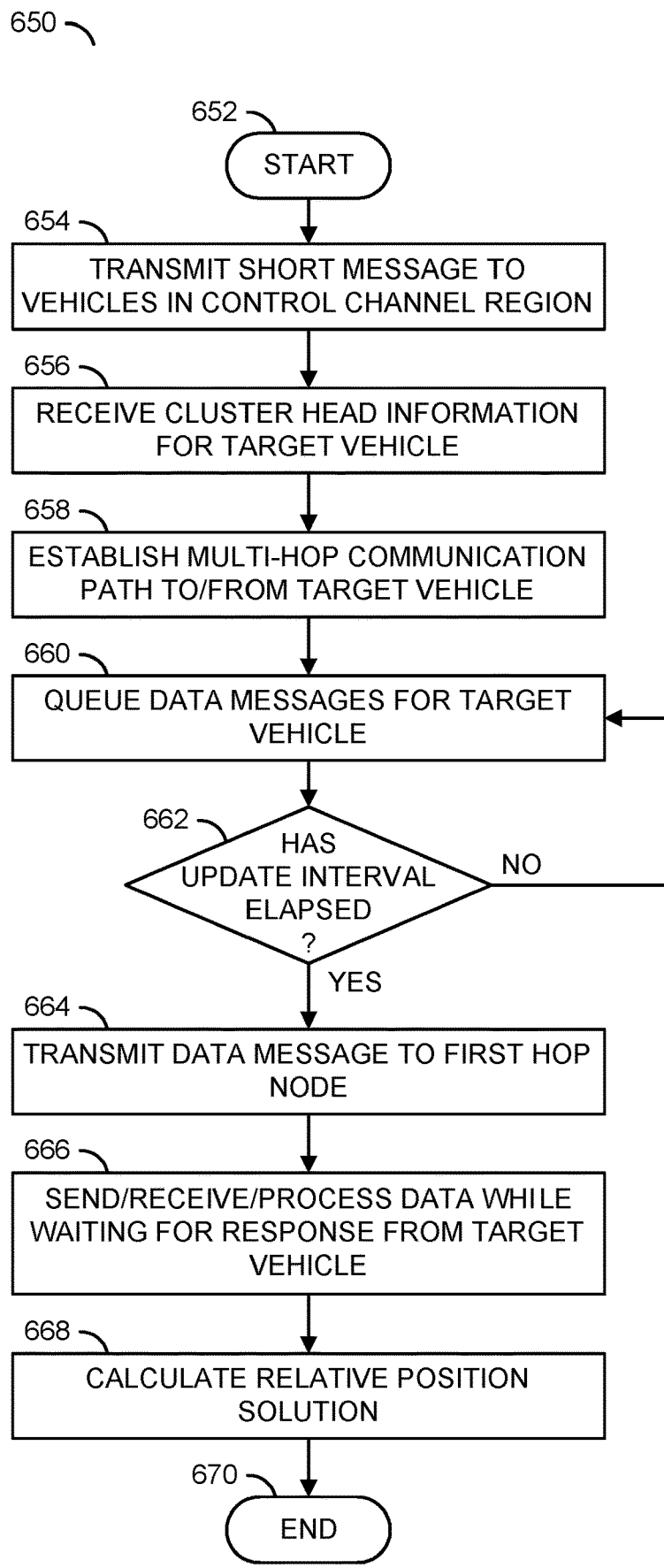
FIG. 11 is a flow diagram illustrating a method for establishing a multi-hop communication path based on data from a short message.

Referring to FIG. 11, a method (or process) 650 is shown. The method 650 may establish a multi-hop communication path based on data from a short message. The method 650 generally comprises a step (or state) 652, a step (or state) 654, a step (or state) 656, a step (or state) 658, a step (or state) 660, a decision step (or state) 662, a step (or state) 664, a step (or state) 666, a step (or state) 668, and a step (or state) 670.

The state 652 may start the method 650. In the state 654, the transceiver 122 may transmit the short messages SA-SC to the vehicles 30a-30n that are located in the control channel region 304. Next, in the state 656, the transceiver 122 may receive (e.g., decode) the cluster head information for the target vehicle 410. For example, the target vehicle 410 may respond to the short message. In the state 658, the processor 124 and/or the transceiver 122 may establish a multi-hop communication path to/from the target vehicle 410. For example, since the target vehicle 410 is located outside of the data message range 302, the communication may use one or more of the cluster heads 322a-322n as multi-hop intermediate nodes to send the data messages DA-DC beyond the range 310. Next, in the state 660, the processor 124 may queue the data messages to be sent to the target vehicle 410. Next, the method 650 may move to the decision state 662.

In the decision state 662, the transceiver 122 may determine whether the update interval has elapsed. If the update interval has not elapsed, the method 650 may return to the state 660. If the update interval has elapsed, the method 650 may move to the state 664. In the state 664, the transceiver 122 may transmit the data messages DA-DC to the first hop node (e.g., the first intermediate node). In one example, the first intermediate node may be one of the cluster heads 322a-322n. In another example, the first intermediate node may be one of the cluster nodes 324a-324n (e.g., the first hop may not have to be to one of the cluster heads 322a-322n). Next, the method 650 may move to the state 666.

In the state 666, the processor 124 may send, receive and/or process data while waiting for a response from the target vehicle 410. Since, the data path to the target vehicle 410 may use multiple hops, and each hop takes one update interval, there may be a delay of multiple update intervals before a response is received. While waiting for the response, the processor 124 may continue normal operation (e.g., sending new data messages and/or short messages, interpreting received data messages and/or short messages, responding to data messages and/or short messages, determining the position coordinates 170$a$, calibrating the sensors 102$a$-102$n$, calculating time of flight and/or round-trip time information, calculating the relative position solution, determining which of the vehicles 30$a$-30$n$ to use for calculating the relative position data 170$d$, communicating the relative position data 170$d$ to other vehicles, etc.). Next, in the state 668, the relative positioning module 152 may calculate the relative position solution. For example, when the response from the target vehicle 410 is received, the relative positioning module 152 may aggregate the information from the target vehicle 410 with other of the data messages DA-DC (e.g., the data from the target vehicle 410 may be treated like any of the other data messages). Next, the method 650 may move to the state 670. The state 670 may end the method 650.

The functions performed by the diagrams of FIGS. 8-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a processor configured to (i) receive data messages from a plurality of vehicles and (ii) determine relative coordinates of said vehicles based on said data messages; and
    a transceiver configured to (i) communicate said data messages using a first channel in a first range and (ii) communicate short messages using a second channel in a second range, wherein (a) communicating using said second channel consumes more power than communicating using the first channel, (b) said data messages are sent from said transceiver to a cluster head within said first range, (c) said short messages communicate less data than said data messages, (d) said short messages are sent directly to a target vehicle outside of said first range to determine an associated cluster head for said target vehicle and (e) said data messages are sent to said target vehicle from said associated cluster head via said cluster head within said first range.

2. The apparatus according to claim 1, wherein said short message is implemented to enable an initialization for a communication using said data messages.

3. The apparatus according to claim 2, wherein said initialization comprises determining a data path from said apparatus to said target vehicle.

4. The apparatus according to claim 2, wherein said initialization using said short messages reduces an amount of time to communicate between said apparatus and said target vehicle.

5. The apparatus according to claim 1, wherein said short messages comprise a vehicle identification and an identification of said cluster head.

6. The apparatus according to claim 1, wherein said short messages are implemented to enable said apparatus to communicate with one or more vehicles beyond said first range.

7. The apparatus according to claim 1, wherein said first range corresponds to a transmission range using a data message communication channel and said second range corresponds to a transmission range using a control channel.

8. The apparatus according to claim 7, wherein said control channel is defined by a Wireless Access for Vehicular Environments (WAVE) standard for vehicle-to-vehicle communication.

9. The apparatus according to claim 1, wherein said data messages are implemented in a Basic Safety Message (BSM) format with at least one of (a) time of flight information and (b) round-trip time information appended.

10. The apparatus according to claim 1, wherein said short messages are used to determine which vehicles to communicate with to send said data messages to said target vehicle and said data messages provide information for calculating a relative position solution based on a response from said target vehicle.

11. The apparatus according to claim 1, wherein said data messages are communicated beyond said first range by performing a multi-hop communication.

12. The apparatus according to claim 11, wherein said multi-hop communication comprises communicating with one or more cluster heads acting as intermediate nodes between said apparatus and said target vehicle.

13. The apparatus according to claim 1, wherein said short messages and said data messages are a periodic broadcast communicated at an update interval.

14. The apparatus according to claim 13, wherein said update interval has a frequency of 10 Hz.

15. The apparatus according to claim 13, wherein said short messages enable a reduction of a number of said update intervals that elapse in order to receive information from said target vehicle.

\* \* \* \* \*